United States Patent
Gotani et al.

(10) Patent No.: US 11,881,725 B2
(45) Date of Patent: Jan. 23, 2024

(54) FOREIGN OBJECT DETECTION DEVICE, POWER TRANSMISSION DEVICE, POWER RECEPTION DEVICE, AND POWER TRANSMISSION SYSTEM

(71) Applicant: TDK CORPORATION, Tokyo (JP)

(72) Inventors: Akira Gotani, Tokyo (JP); Kazuki Kondo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 22 days.

(21) Appl. No.: 17/620,499

(22) PCT Filed: Dec. 4, 2020

(86) PCT No.: PCT/JP2020/045217
§ 371 (c)(1),
(2) Date: Dec. 17, 2021

(87) PCT Pub. No.: WO2021/131607
PCT Pub. Date: Jul. 1, 2021

(65) Prior Publication Data
US 2022/0360113 A1    Nov. 10, 2022

(30) Foreign Application Priority Data
Dec. 27, 2019   (JP) ................................. 2019-239625

(51) Int. Cl.
H02J 50/60   (2016.01)
H02J 50/10   (2016.01)
B60L 53/124  (2019.01)

(52) U.S. Cl.
CPC ............ *H02J 50/60* (2016.02); *B60L 53/124* (2019.02); *H02J 50/10* (2016.02)

(58) Field of Classification Search
CPC ......... B60L 53/124; H02J 50/10; H02J 50/12; H02J 50/60
See application file for complete search history.

(56) References Cited

U.S. PATENT DOCUMENTS

2012/0181875 A1*  7/2012  Wechlin .................. B60L 53/39
                                                         307/104
2013/0099592 A1    4/2013  Abe
(Continued)

FOREIGN PATENT DOCUMENTS

JP    2012-016125 A    1/2012
JP    2016-140179 A    8/2016
(Continued)

OTHER PUBLICATIONS

Jan. 26, 2021 International Search Report issued in International Patent Application No. PCT/JP2020/045217.

*Primary Examiner* — Levi Gannon
(74) *Attorney, Agent, or Firm* — Oliff PLC

(57) ABSTRACT

A foreign object detection device includes a plurality of coils (240) each including a first conductive pattern mounted on one surface of a detection coil substrate (220) to be excited and thus generate a vibration signal, a detector (26) to detect the existence of a foreign object on the basis of the vibration signal, a first connecting line (230) to connect one terminals (T1) of the individual coils (240) to the detector (26), and a second connecting line (232) to connect the other terminals (T2) of the individual coils (240) to the detector (26). The first connecting line (230) and the second connecting line (232) extend in substantially identical paths in at least segments mounted on the detection coil substrate (220).

16 Claims, 20 Drawing Sheets

(56) References Cited

U.S. PATENT DOCUMENTS

| | | | | |
|---|---|---|---|---|
| 2013/0134792 | A1* | 5/2013 | Bunsen | H02J 50/12 |
| | | | | 324/633 |
| 2017/0033609 | A1* | 2/2017 | Nakamura | H02J 50/12 |
| 2018/0026482 | A1* | 1/2018 | Asano | H02J 50/12 |
| | | | | 307/104 |
| 2019/0363588 | A1* | 11/2019 | Daetwyler | H02J 50/12 |
| 2019/0393732 | A1 | 12/2019 | Oshima et al. | |
| 2020/0094697 | A1* | 3/2020 | Nagata | B60L 53/37 |
| 2023/0016466 | A1* | 1/2023 | Berggren | H02J 50/60 |

FOREIGN PATENT DOCUMENTS

| | | |
|---|---|---|
| JP | 2017-055528 A | 3/2017 |
| JP | 2018-105776 A | 7/2018 |

\* cited by examiner

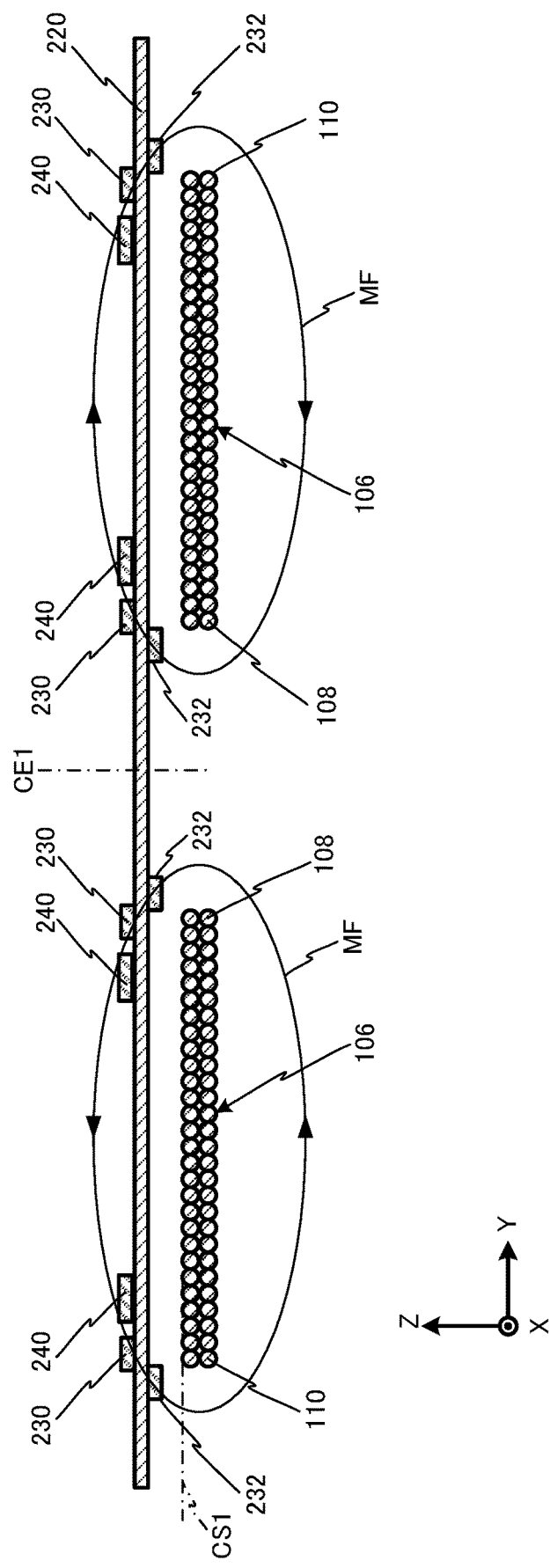

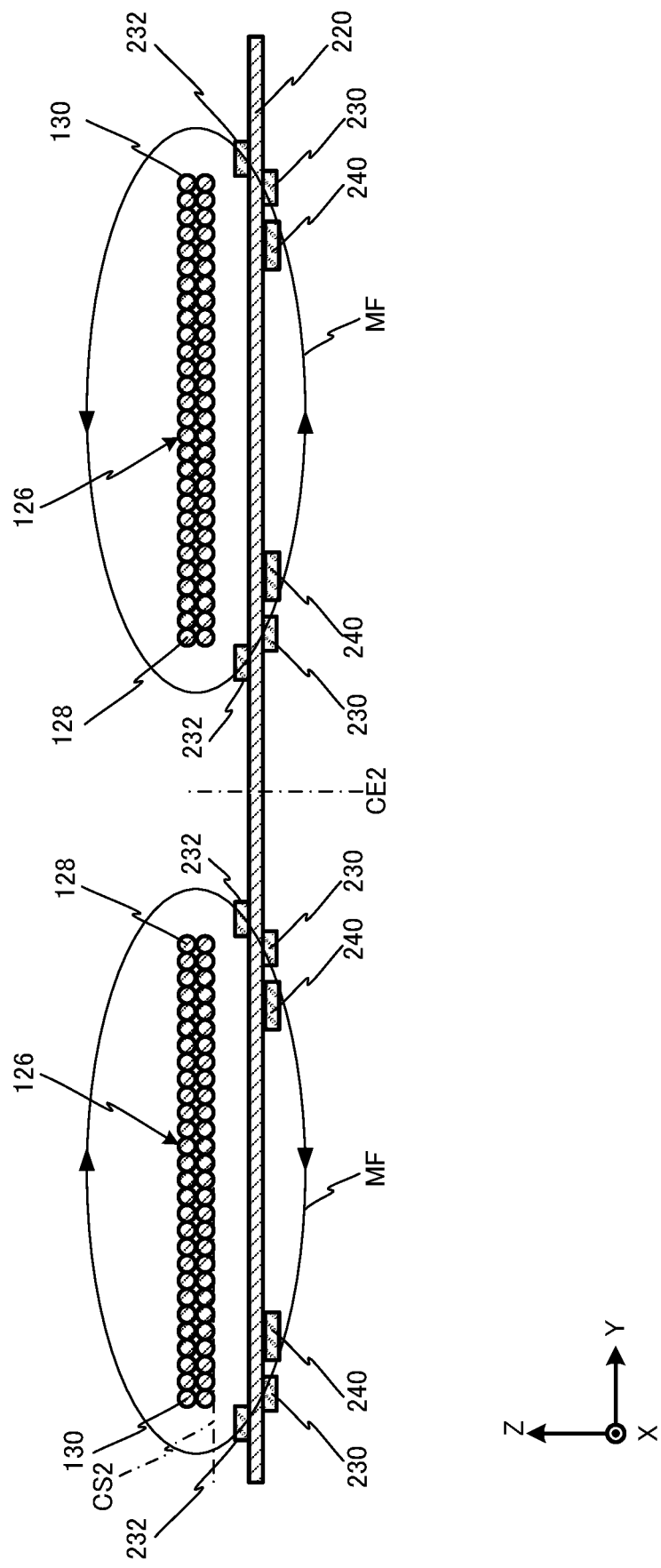

FOREIGN OBJECT DETECTION DEVICE, POWER TRANSMISSION DEVICE, POWER RECEPTION DEVICE, AND POWER TRANSMISSION SYSTEM

TECHNICAL FIELD

The present disclosure relates to a foreign object detection device, a power transmission device, a power reception device, and a power transfer system.

BACKGROUND ART

Recent interest has been focused on wireless power transfer techniques for transferring electric power without a power supply cable. These wireless power transfer techniques can achieve wireless transmission of electric power from a power transmission device to a power reception device, and are therefore expected to be applied to various products, for example, transport equipment, such as trains and electric vehicles, home appliances, electronic equipment, and wireless communication equipment.

The wireless power transfer techniques use a power transmission coil and a power reception coil coupled by a magnetic flux for the purpose of power transmission. Unfortunately, an unwelcomed foreign object, such as a metal fragment, may exist in the vicinity of the power transmission coil and the power reception coil, and may bring about adverse effects on power transmission from the power transmission coil to the power reception coil. This problem requires a solution to appropriately detect such a foreign object existing in the vicinity of the power transmission coil and the power reception coil.

Patent Literature 1 discloses a foreign object detection device that detects the existence of a foreign object on the basis of an induced voltage generated in a plurality of foreign object detecting coils arranged to cover the power transmission coil. This foreign object detection device is, however, designed without consideration of paths of connecting lines for guiding the induced voltage at the foreign object detecting coils to the detecting device.

If the connecting lines configure a large loop circuit, the alternating magnetic flux for power transmission generated at the power transmission coil may induce a high electromotive force in the connecting lines, resulting in a damage in peripheral circuits, such as the foreign object detecting coil and a detection circuit.

CITATION LIST

Patent Literature

Patent Literature 1: Unexamined Japanese Patent Application Publication No. 2017-055528

SUMMARY OF INVENTION

Technical Problem

An objective of the present disclosure, which has been accomplished in view of the above problems, is to reduce an induced voltage caused by the magnetic flux generated at the power transmission coil in the foreign object detection device.

Solution to Problem

In order to solve the above problem, a foreign object detection device according to an aspect of the present disclosure includes: a plurality of coils mounted on a substrate to be excited and thus generate a vibration signal; a detector to detect the existence of a foreign object on the basis of the vibration signal; a first connecting line to connect one terminals of the individual coils to the detector; and a second connecting line to connect the other terminals of the individual coils to the detector. The first connecting line and the second connecting line extend in substantially identical paths in at least segments mounted on the substrate among paths from the individual coils to the detector.

A power transmission device according to another aspect of the present disclosure includes the above-described foreign object detection device.

A power reception device according to another aspect of the present disclosure includes the above-described foreign object detection device.

A power transfer system according to another aspect of the present disclosure includes a power transmission device and a power reception device. At least one of the power transmission device or the power reception device includes the above-described foreign object detection device.

Advantageous Effects of Invention

In the above-described foreign object detection device, the connecting lines do not configure a loop circuit defining a large opening, thereby making the induced voltage as low as possible.

BRIEF DESCRIPTION OF DRAWINGS

FIG. 13 is a sectional view illustrating an exemplary arrangement structure of the first connecting line and the second connecting line according to Embodiment 1 in regions facing an inner peripheral region and an outer peripheral region of the power transmission coil;

FIG. 18 is a sectional view illustrating an exemplary arrangement structure of the first connecting line and the second connecting line according to Embodiment 2 in regions facing an inner peripheral region and an outer peripheral region of the power reception coil.

DESCRIPTION OF EMBODIMENTS

Figure 1A:
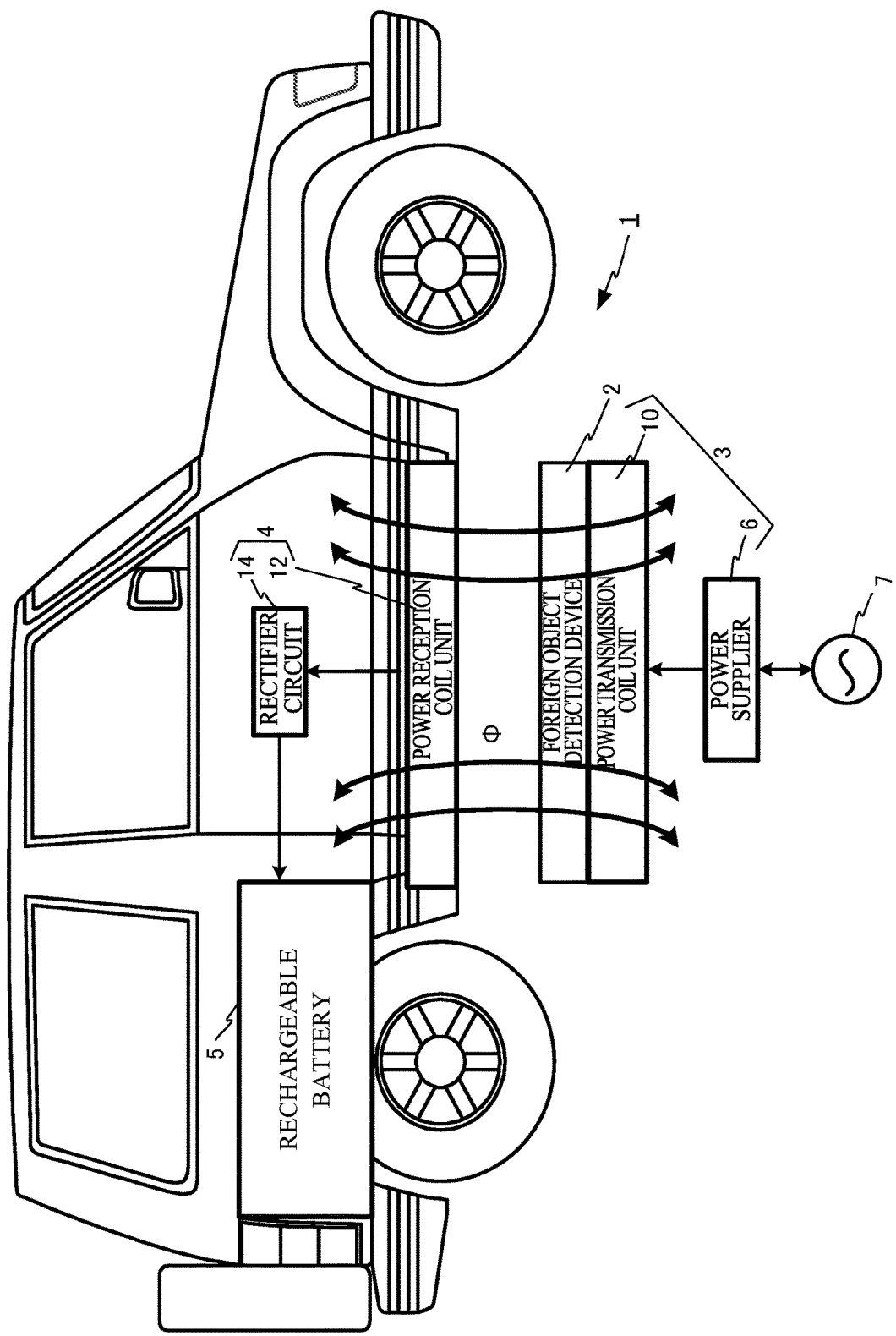
FIG. 1A illustrates a configuration of a power transfer system including a foreign object detection device according to Embodiment 1 of the present disclosure.

A foreign object detection device, a power transmission device, a power reception device, and a power transfer system according to embodiments of the present disclosure are described below. In the following description and drawings, the corresponding components are provided with the same reference symbol. The drawings illustrate a coordinate system including the X axis (first direction), the Y axis (second direction), and the Z axis (first axis) orthogonal to each other, to clarify the directions. The features, such as the number, shapes, dimensions, and dimensional ratios, of components illustrated in the drawings are mere examples and not intended to limit the technical scope of the present disclosure.

A power transfer system 1 according to the embodiments can be applied to various devices. Examples of the devices include mobile devices, such as smartphones, electric vehicles, and industrial equipment. The following description is directed to an example in which the power transfer system 1 is used for charging a rechargeable battery 5 of an electric vehicle.

Embodiment 1

As illustrated in FIG. 1A, the power transfer system 1 according to the embodiment is a wireless power transfer system to wirelessly transfer electric power from a power transmission side to a power reception side. The power transfer system 1 includes a power transmission device 3, a power reception device 4, and a foreign object detection device 2. The power transmission device 3 is a wireless power transmission device to wirelessly transmit AC power to an electric vehicle. The power transmission device 3 includes a power supplier 6 and a power transmission coil unit 10.

The power supplier 6 generates AC power at a frequency of 75 to 90 kHz from a commercial power supply 7 to be transmitted, for example, and feeds the generated power to the power transmission coil unit 10.

Figure 1B:
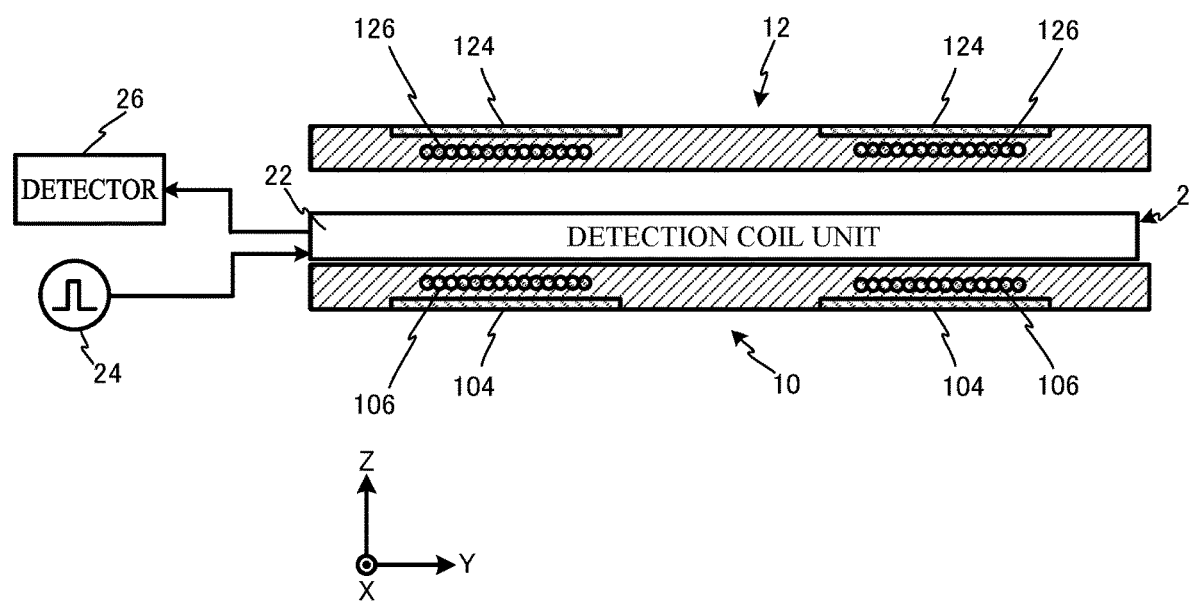
FIG. 1B illustrates configurations of a power transmission coil unit, the foreign object detection device, and a power reception coil unit according to Embodiment 1.

As illustrated in FIG. 1B, the power transmission coil unit 10 includes a magnetic plate 104 made of a magnetic material, such as ferrite, and a power transmission coil 106 including a conductive wire coiled in a flat spiral on the magnetic plate 104. The power transmission coil 106 is fed with the AC power from the power supplier 6 and induces an alternating magnetic flux 1.

The power reception device 4 illustrated in FIG. 1A is a wireless power reception device to wirelessly receive the electric power from the power transmission device 3 and charge the rechargeable battery 5. The power reception device 4 includes a power reception coil unit 12 and a rectifier circuit 14. As illustrated in FIG. 1B, the power reception coil unit 12 includes a magnetic plate 124, and a power reception coil 126 including a conductive wire coiled in a flat spiral on the magnetic plate 124. The power reception coil unit 12 faces the power transmission coil unit 10 when the electric vehicle stops at a predetermined position. When the power transmission coil 106 receives electric power from the power supplier 6 and induces the alternating magnetic flux 1, which interlinks with the power reception coil 126, so that an induced electromotive force is generated at the power reception coil 126.

The rectifier circuit 14 illustrated in FIG. 1A rectifies and smooths the induced electromotive force generated at the power reception coil 126 of the power reception coil unit 12, and feeds the resulting DC power to the rechargeable battery 5 to charge the rechargeable battery 5. A charging circuit may be disposed between the rectifier circuit 14 and the rechargeable battery 5.

The foreign object detection device 2 illustrated in FIGS. 1A and 1B detects whether any foreign object exists between the power transmission coil unit 10 and the power reception coil unit 12.

As illustrated in FIG. 1B, the foreign object detection device 2 includes a detection coil unit 22, a pulse generator 24, and a detector 26.

The detection coil unit 22 includes a plurality of loop coils, has a flat-plate shape, and is disposed on the upper surface of the power transmission coil 106 included in the power transmission coil unit 10.

The pulse generator 24 generates a pulsed voltage for detection of a foreign object, selects a loop coil, and applies the pulsed voltage to the selected loop coil. The detector 26 serves as a detector to detect the existence of a foreign object by processing a responding vibration signal output from the loop coil when the loop coil is excited by application of the pulsed voltage.

Figure 2:
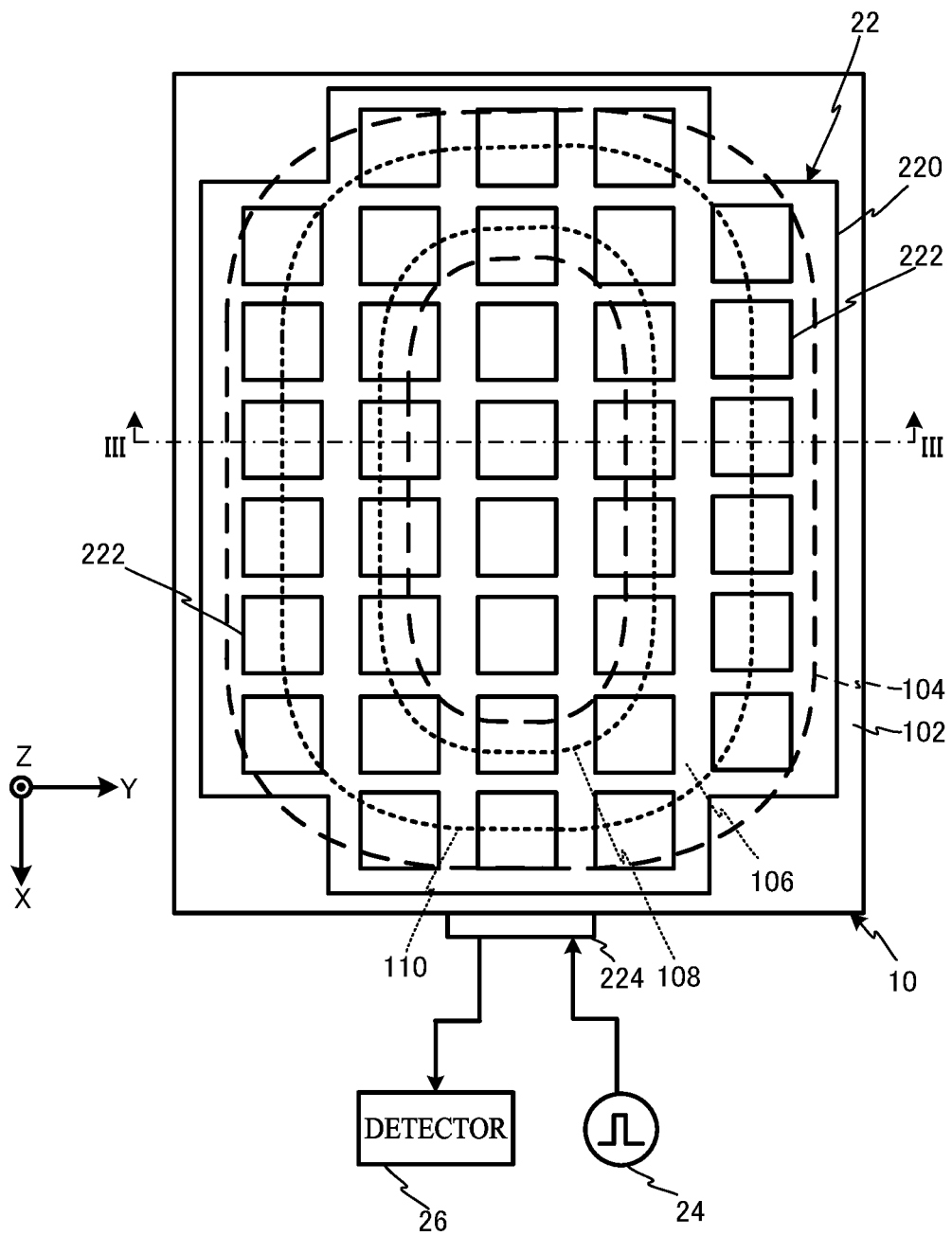
FIG. 2 is a plan view of the power transmission coil unit and a detection coil unit disposed on the upper surface of the power transmission coil unit according to Embodiment 1.
Figure 3:
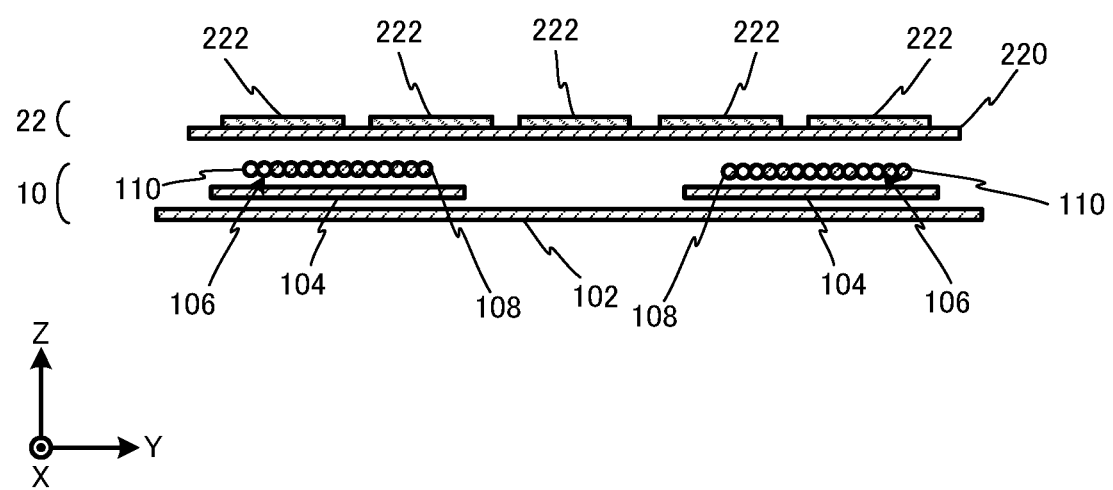
FIG. 3 is a sectional view taken along the line III-III of FIG. 2.

FIG. 2 is a plan view of the power transmission coil unit 10 and the detection coil unit 22 of the foreign object detection device 2 disposed on the upper surface of the power transmission coil unit 10. FIG. 3 is a sectional view taken along the line III-III of FIG. 2. In the following description, "upper" indicates the positive side in the Z-axis direction and "lower" indicates the negative side in the Z-axis direction.

As illustrated in FIGS. 2 and 3, the power transmission coil unit 10 includes a substrate 102, the magnetic plate 104, and the power transmission coil 106. The substrate 102 is made of an aluminum plate, for example, and supports the magnetic plate 104 and the power transmission coil 106. The magnetic plate 104 is made of a plate of a magnetic material, such as ferrite, and has a function of enhancing the magnetic coupling between the power transmission coil 106 and the power reception coil 126. The power transmission coil 106 defines an opening and includes a conductive wire made of an electrically conductive material, such as copper, and coiled in a flat spiral on the magnetic plate 104.

In contrast, the detection coil unit 22 includes a detection coil substrate 220 and a plurality of loop coils 222.

The detection coil substrate 220 is made of a plate of a magnetically permeable material, such as resin, and disposed on the upper surface of the power transmission coil 106.

The loop coils 222 are mounted on the detection coil substrate 220 and arranged in a two-dimensional array in a region for detection of a foreign object in a plan view.

The detection coil unit 22 is described in detail below with reference to FIG. 4, which illustrates the circuit pattern of the detection coil unit 22.

Figure 4:
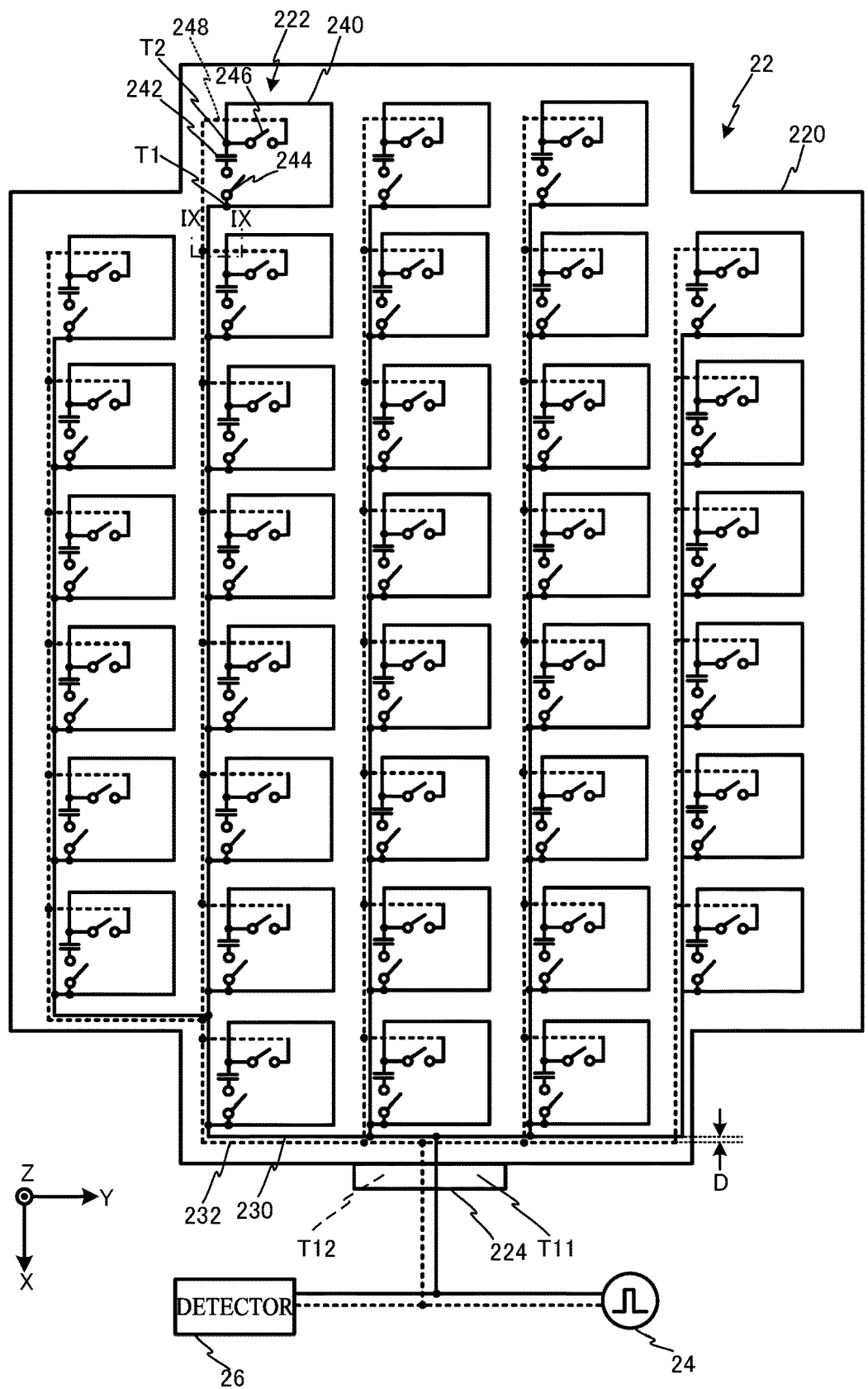
FIG. 4 is a plan view of the detection coil unit illustrated in FIG. 2.

As illustrated in FIG. 4, the detection coil unit 22 includes the detection coil substrate 220, the 36 loop coils 222, a first connecting line 230 represented by the solid line segments and mounted on the upper surface of the detection coil substrate 220, a second connecting line 232 represented by the dotted line segments and mounted on the lower surface of the detection coil substrate 220, and an external connector 224.

The 36 loop coils 222 are arranged in a two-dimensional array on the upper surface (first surface) of the detection coil substrate 220 to cover the coil surface surrounded by an outer peripheral region 110 of the power transmission coil 106. The loop coils 222 each have the configuration identical to each other. Each of the loop coils 222 includes a coil 240, a capacitor 242 having two terminals, mechanical or electronic switches 244 and 246, and a wiring pattern 248. The reference symbols are provided to only the single loop coil 222 to improve the visibility of the figure.

The coil 240 includes a conductive pattern (first conductive pattern) turned once on the upper surface of the detection coil substrate 220, for example. The conductive pattern has terminals T1 and T2 at the respective ends.

The one terminal T1 of the coil 240 is connected to the first connecting line 230 and one terminal of the switch 244. The other terminal T2 of the coil 240 is connected to one terminal of the capacitor 242 and one terminal of the switch 246. The other terminal of the switch 246 is connected to one end of the wiring pattern (second conductive pattern) 248. The wiring pattern 248 extends through a via hole to the lower surface of the detection coil substrate 220, then further extends on the lower surface, and leads to the second connecting line 232. The other terminal of the capacitor 242 is connected to the other terminal of the switch 244.

The switches 244 and 246 are turned on (in the conductive state) or off (in the non-conductive state), under the control of the detector 26 via a control line, which is not illustrated. The switch 244 serves to cause the connection of the coil 240 to the capacitor 242 to be switched between the conductive state and the non-conductive state. While the switch 244 is on, the coil 240 and the capacitor 242 configure a resonant circuit. The switch 246 serves to cause the connection of the resonant circuit to the pulse generator 24 and the detector 26 to be switched between the conductive state and the non-conductive state. That is, while the switches 244 and 246 are both on, the coil 240 and the capacitor 242 configure a resonant circuit, which receives a pulsed voltage applied from the pulse generator 24 via a first external connection terminal T11 and a second external connection terminal T12 of the external connector 224, the first connecting line 230 and the second connecting line 232, and the terminals T1 and T2. In contrast, the voltage between both terminals of the resonant circuit, that is, the voltage between the terminals T1 and T2 is guided to the detector 26 via the first connecting line 230 and the second connecting line 232, and the first external connection terminal T11 and the second external connection terminal T12.

While the switches 244 and 246 are both off, the coil 240 and the capacitor 242 do not configure a resonant circuit, and are electrically disconnected from the first connecting line 230 and the second connecting line 232 and from the pulse generator 24 and the detector 26.

Figure 5:
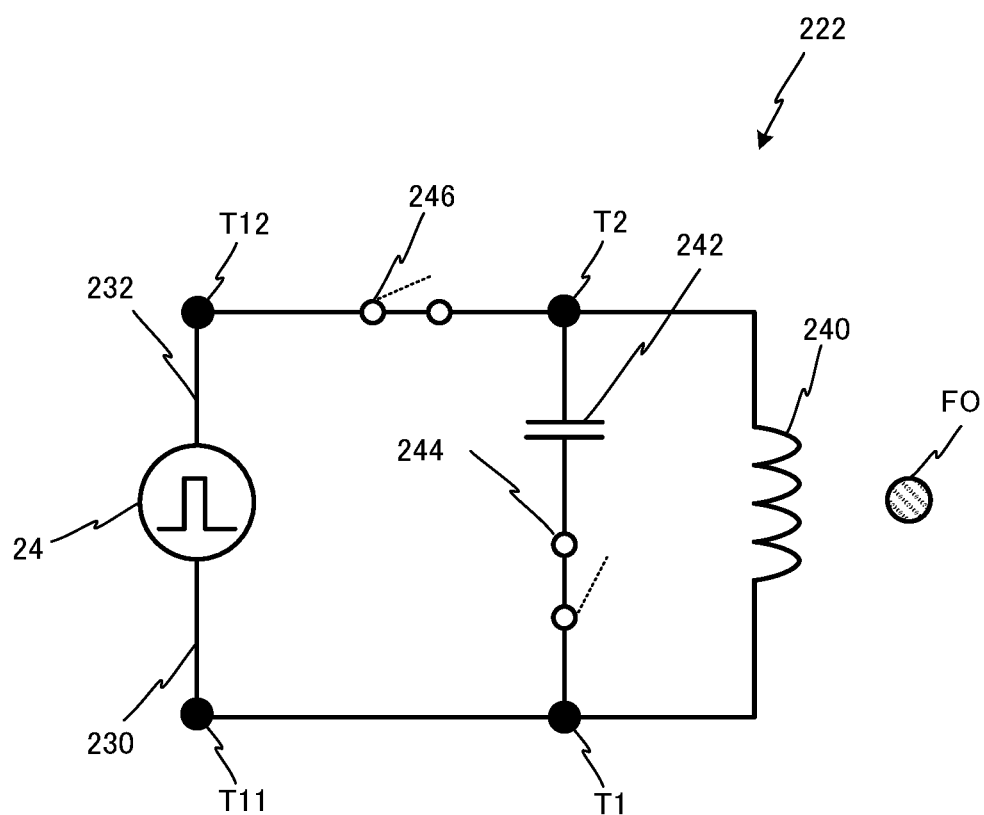
FIG. 5 illustrates an exemplary connection relationship between a pulse generator and an equivalent circuit of the resonant circuit configured by a coil and a capacitor of a loop coil illustrated in FIG. 4, and an exemplary foreign object in the vicinity of the circuit.
Figure 6:
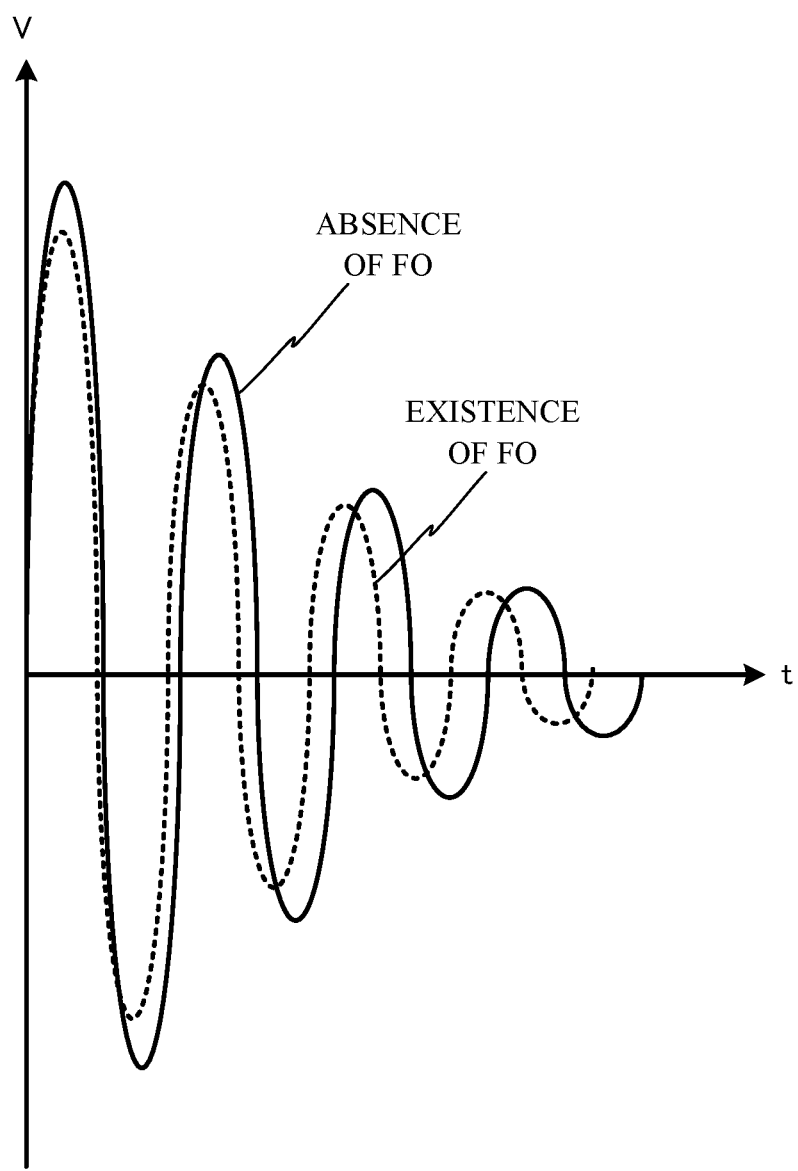
FIG. 6 illustrates an exemplary transitional change in the voltage between both terminals of the resonant circuit illustrated in FIG. 5 in response to application of a pulsed voltage to the resonant circuit.

FIG. 5 illustrates an exemplary equivalent circuit of the resonant circuit configured by the coil 240 and the capacitor 242 of the loop coil 222, and an exemplary foreign object (FO) in the vicinity of the circuit. FIG. 6 illustrates an exemplary transitional change in a voltage V in the resonant circuit generated in response to application of a single pulsed voltage from the pulse generator 24 to the resonant circuit.

In the case where the switch 244 is on and causes the coil 240 and the capacitor 242 to configure a resonant circuit, when the switch 246 is closed and allows a single pulsed voltage to be applied from the pulse generator 24, the voltage between both terminals of the resonant circuit, that is, the voltage V between the terminals T1 and T2 corresponds to a vibration signal having an oscillatory waveform of which the peak value gradually attenuates as the time t passes.

The description assumes that the voltage V when no foreign object exists in the vicinity of the coil 240 corresponds to a vibration signal having the waveform represented by the solid line in FIG. 6.

In contrast, the existence of any foreign object FO, such as a metal or magnetic object, in the vicinity of the coil 240 causes a variation in the inductance of the coil 240. Accordingly, when any foreign object FO exists in the vicinity of the coil 240, the frequency of a vibration signal of the voltage V between both terminals of the resonant circuit deviates from the frequency of the vibration signal in the case of no foreign object, has a different attenuation level, or has a disturbed waveform, as represented by the dotted line in FIG. 6. Such a deviation in the frequency, a disturbance of the waveform, and the like of the vibration signal of the voltage V between both terminals of the resonant circuit are analyzed at the detector 26 to determine whether any foreign object FO exists in the vicinity of the coil 240.

Figure 7:
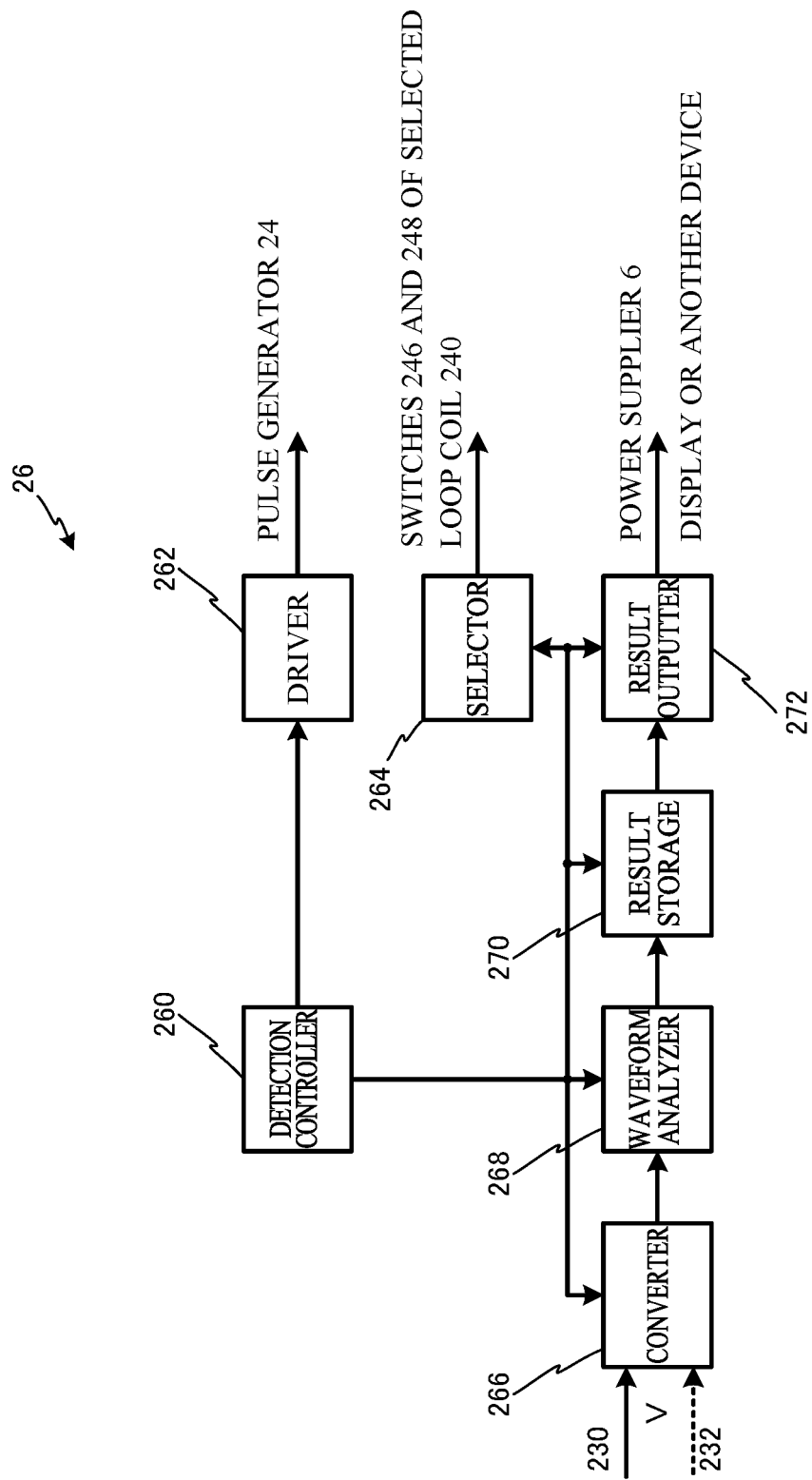
FIG. 7 illustrates an exemplary configuration of a detector illustrated in FIG. 2.

FIG. 7 illustrates an exemplary configuration of the detector 26. The detector 26 is achieved by, for example, a computer including various interfaces, such as central processing unit (CPU), memory, and analog/digital (A/D) conversion device, and operational programs.

As illustrated in FIG. 7, the detector 26 has a functional configuration including a detection controller 260, a driver 262, a selector 264, a converter 266, a waveform analyzer 268, a result storage 270, and a result outputter 272.

The detector 26 causes these components to select any of the 36 loop coils 222, turn on the switches 244 and 246 of the selected loop coil 222, turn off the switches 244 and 246 of the loop coils 222 that are not selected, and detect the existence of a foreign object FO in the vicinity of the coil 240 of the selected loop coil 222. The detector 26 conducts such a process of detecting the existence of a foreign object sequentially for all the 36 loop coils 222 to detect the existence of a foreign object FO in the vicinity of the individual 36 loop coils 222, and outputs results of the detection.

The detection controller 260 controls operations of the individual components of the detector 26, to detect whether any foreign object FO exists in the vicinity of the individual coils 240 of all the 36 loop coils 222, and output results of the detection.

The selector 264 selects any one of the 36 loop coils 222 under the control of the detection controller 260. The selector 264 then turns on the switches 244 and 246 of the selected loop coil 222.

After completion of the selection of the loop coil 222 and turning on of the switches 244 and 246 at the selector 264, the driver 262 drives the pulse generator 24 under the control of the detection controller 260. The pulse generator 24 then outputs a single pulsed voltage. This pulsed voltage is applied to the resonant circuit via the first external connection terminal T11 and the second external connection terminal T12, the first connecting line 230 and the second connecting line 232, the terminals T1 and T2, and the switches 244 and 246 in the on states. Simultaneously, the voltage V between the terminals T1 and T2 of the resonant circuit is guided to the converter 266 via the first connecting line 230 and the second connecting line 232, and the first external connection terminal T11 and the second external connection terminal T12.

The converter 266 sequentially converts the waveform of the guided voltage V in an analog format into data in a digital format and outputs the resulting data to the waveform analyzer 268, under the control of the detection controller 260.

The waveform analyzer 268 analyzes the input data on the voltage waveform and acquires the frequency of the voltage waveform, attenuation rate, and disturbance of the waveform, under the control of the detection controller 260. The waveform analyzer 268 determines that a foreign object FO exists in the vicinity of the selected loop coil 222, for example, when the frequency and the attenuation rate of the voltage waveform deviate from predetermined ranges, or when the voltage waveform has features implying the existence of a foreign object.

The waveform analyzer 268 causes the detection results indicating whether any foreign object exists in the vicinity of the respective coils 240 of the 36 loop coils 222 to be stored into the result storage 270.

The result outputter 272 outputs the detection results stored in the result storage 270 to an output device, such as display, to present the detection results to a user, under the control of the detection controller 260.

The result outputter 272 also outputs the detection results stored in the result storage 270 to the power supplier 6. In the case of a detection result indicating the existence of a foreign object, the result outputter 272 immediately outputs the detection result to the power supplier 6. When a detection result input before the start of wireless power transfer indicates the existence of a foreign object FO, the power supplier 6 does not start the operation of wireless power transfer. When a detection result input during wireless power transfer indicates the existence of a foreign object FO, the power supplier 6 immediately stops the operation of wireless power transfer. In contrast, in the case of detection results indicating the absence of a foreign object FO, the result outputter 272 outputs the detection results to the power supplier 6 at regular intervals. When detection results input at regular intervals during a predetermined period before the start of wireless power transfer indicate the absence of a foreign object FO, the power supplier 6 starts the operation of wireless power transfer. When detection results input at regular intervals during wireless power transfer indicate the absence of a foreign object FO, the power supplier 6 continues the operation of wireless power transfer.

A foreign object detecting process executed in the foreign object detection device 2 is described below with reference to the flowchart of FIG. 8.

Figure 8:
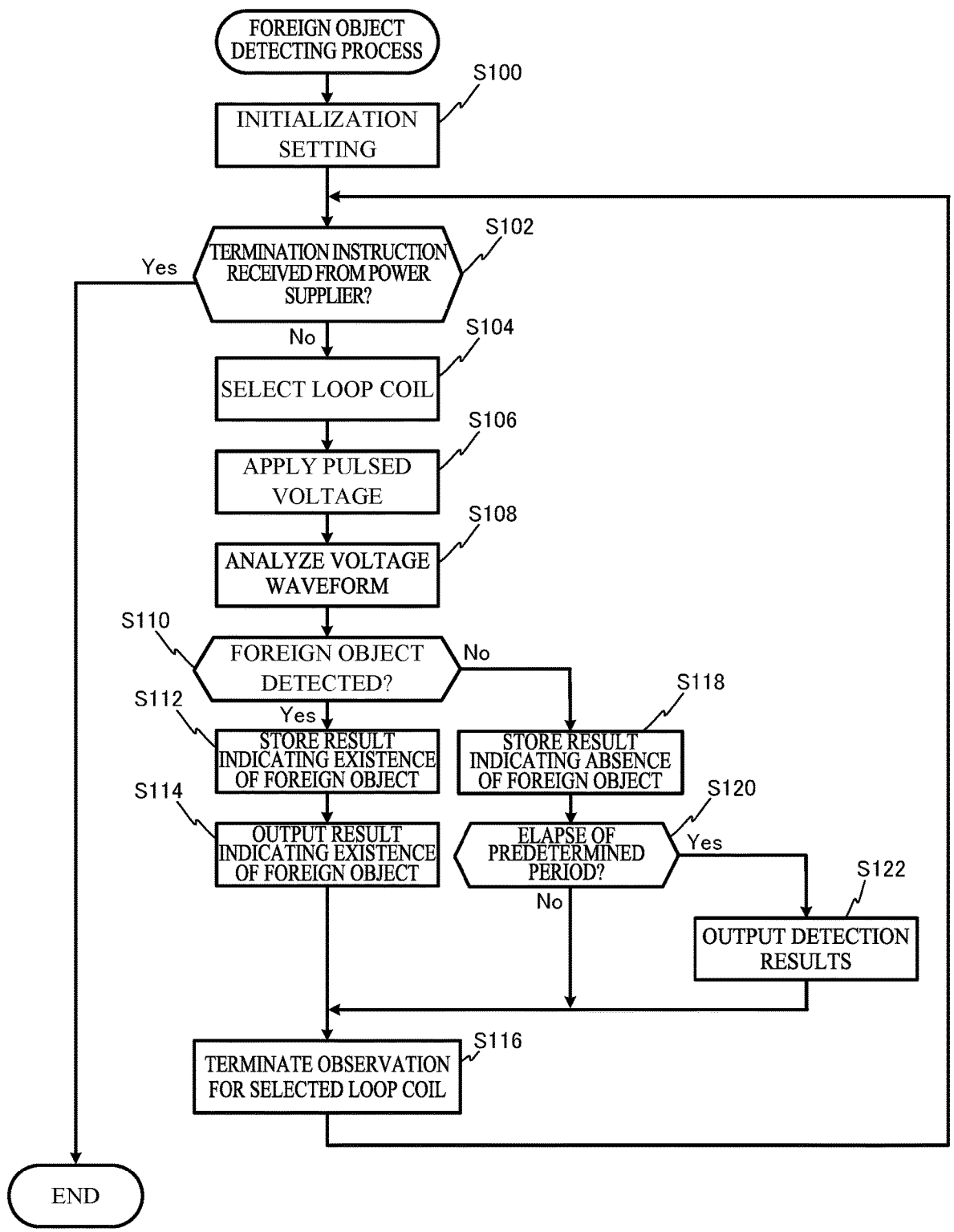
FIG. 8 is a flowchart of a foreign object detecting process executed in the foreign object detection device according to Embodiment 1.

When being activated in response to an instruction from the power supplier 6, the foreign object detection device 2 starts the foreign object detecting process illustrated in FIG. 8. First, in Step S100, the detection controller 260 of the detector 26 causes the selector 264 to execute an initialization setting step, such as turning off of the switches 244 and 246 of all the 36 loop coils 222.

Then, in Step S102, the detection controller 260 determines whether an instruction to terminate the foreign object detecting process has been received from the power supplier 6. When a termination instruction has been received (Step S102: Yes), the detection controller 260 terminates the ongoing foreign object detecting process.

In contrast, when no termination instruction has been received (Step S102: No), the detection controller 260 causes the selector 264 to select one of the unprocessed loop coils 222 in Step S104, in a cycle of sequential execution of the foreign object detecting process for the 36 loop coils 222. In the case of no unprocessed loop coil 222, the detection controller 260 starts a new cycle and causes the selector 264 to select any one loop coil 222. The detection controller 260 then causes the selector 264 to turn on the switches 244 and 246 of the selected loop coil 222.

In Step S106, the detection controller 260 causes the driver 262 to drive the pulse generator 24 so that the pulse generator 24 outputs a pulsed voltage. This pulsed voltage is applied to the resonant circuit configured by the coil 240 and the capacitor 242 of the selected loop coil 222. The detection controller 260 causes the converter 266 to convert the voltage V guided via the first connecting line 230 and the second connecting line 232 into data in a digital format, and output the resulting data to the waveform analyzer 268.

In Step S108, the detection controller 260 causes the waveform analyzer 268 to analyze the data indicating the voltage waveform, and determine whether any foreign object FO exists in the vicinity of the selected loop coil 222.

In Step S110, the detection controller 260 determines whether the waveform analyzer 268 determines that a foreign object FO exists in the vicinity of the selected loop coil 222, that is, the waveform analyzer 268 detects a foreign object FO. When any foreign object FO is detected in the vicinity of the selected loop coil 222 (S110: Yes), the detection controller 260 proceeds to Step S112. In contrast, when no foreign object FO is detected (S110: No), the detection controller 260 proceeds to Step S118.

In Step S112, the detection controller 260 controls the waveform analyzer 268 so that the waveform analyzer 268 causes a result indicating that a foreign object FO is detected in the vicinity of the selected loop coil 222, to be stored into the result storage 270.

In Step S114, the detection controller 260 causes the result outputter 272 to notify the power supplier 6 of the result indicating that a foreign object FO is detected. In accordance with this notification, the power supplier 6 does not start the operation of wireless power transfer before the start of wireless power transfer, or immediately stops the operation of wireless power transfer during wireless power transfer. The result outputter 272 also outputs the results indicating that a foreign object FO is detected to an output device, such as display, to present the results to the user.

In Step S116, the detection controller 260 causes the selector 264 to turn off the switches 244 and 246 of the loop coil 222 selected in Step S104, and returns to Step S102.

In Step S118, the detection controller 260 controls the waveform analyzer 268 so that the waveform analyzer 268 causes a result indicating that no foreign object FO is detected in the vicinity of the selected loop coil 222, to be stored into the result storage 270.

In Step S120, the detection controller 260 determines whether a predetermined period has elapsed since the previous notification of detection results.

When the predetermined period has elapsed since the previous notification of detection results (Step S120: Yes), the detection controller 260 causes the result outputter 272 to notify the power supplier 6 of the detection results accumulated in the result storage 270. The power supplier 6 determines whether only the detection results indicating the absence of a foreign object have been input for the predetermined period before the start of wireless power transfer, or continues the operation of wireless power transfer during wireless power transfer. The result outputter 272 also outputs the result indicating that no foreign object is detected to the output device, such as display, to present the result to the user. After the output of the detection results in Step S122, the process goes to Step S116 described above.

In contrast, when the predetermined period has not elapsed since the previous notification of detection results in Step S120 (Step S120: No), the process goes to Step S116 described above.

Through the above process, the foreign object detection device 2 is able to detect the existence of a foreign object FO in the power transfer system 1.

The detection coil unit 22 of the foreign object detection device 2 is disposed on the upper surface of the power transmission coil unit 10 all the time, and is receiving the alternating magnetic flux Φ from the power transmission coil unit 10 during the operation of wireless power transfer. If the detection coil unit 22 includes a loop circuit, the alternating magnetic flux Φ interlinks with this loop circuit and induces a voltage. In particular, in the case of a loop circuit defining a larger opening, a larger amount of magnetic flux interlinks with the loop circuit and induces a higher voltage, and may cause a failure, such as a damage in peripheral circuits connected to the loop circuit.

In this embodiment, for example, a relatively large loop circuit may be configured. Examples of the possible loop circuit include a loop circuit configured by the pulse generator 24, the first external connection terminal T11, the first connecting line 230, the loop coil 222, the second connecting line 232, the second external connection terminal T12, and the pulse generator 24 in the order mentioned, and a loop circuit configured by the detector 26, the first external connection terminal T11, the first connecting line 230, the loop coil 222, the second connecting line 232, the second external connection terminal T12, and the detector 26 in the order mentioned.

In order to solve this problem, the first connecting line 230 and the second connecting line 232 extend in substantially identical paths on the detection coil substrate 220 in the present disclosure. This configuration can make the opening defined by a loop circuit as small as possible and reduce the alternating magnetic flux 1 to interlink with the loop circuit, thereby decreasing an induced voltage and avoiding a damage in circuits.

The expression "the first connecting line 230 and the second connecting line 232 extend in substantially identical paths" means, for example, that the connecting lines extend in parallel while being insulated from each other, and mostly extend side by side although some segments of the connecting lines extend in different paths and are connected to other circuits. Referring back to FIG. 4, the following description is directed to a specific example of the first connecting line 230 and the second connecting line 232 to connect the first external connection terminal T11 and the second external connection terminal T12 to the terminals T1 and T2 of the loop coils 222. The first connecting line 230 connected to the first external connection terminal T11 and the second connecting line 232 connected to the second external connection terminal T12 are adjacent to each other with a distance D therebetween on both surfaces of the detection coil substrate 220, extend in parallel to each other approximately toward the negative side in the Y direction, extend in parallel to each other approximately toward the negative side in the X direction, and then extend in different paths at the ends to be connected to the terminals T1 and T2 of the loop coils 222. Despite of the branch segments extending in different paths to be connected to the terminals T1 and T2 of the loop coils 222, the main segments of the connecting lines extend in the identical path. The connecting lines are thus deemed to extend in substantially identical paths. In such a wiring structure, the first connecting line 230 and the second connecting line 232 do not configure a loop circuit defining a large opening, thereby reducing the magnetic flux to interlink with the loop circuit and decreasing the induced voltage. The ratio of the segments of the first connecting line 230 and the second connecting line 232 extending in the identical path to the entire connecting lines is preferably 40% or more, and more preferably 60% or more.

As illustrated in FIG. 4, the coils 240 of the 36 loop coils 222 are arranged such that a plurality of coil arrays including a plurality of coils 240 aligned in the first direction (Y direction) are aligned in the second direction (X direction) on a surface of the detection coil substrate 220. The first connecting line 230 is connected to the one terminals T1 of the individual coils 240 constituting the coil arrays. The second connecting line 232 is connected to the other terminals T2 of the individual coils 240 constituting the coil arrays. The coil arrays thus need to have only a small space therebetween that can accommodate at least each one of the first connecting line 230 and the second connecting line 232, so that the coils 240 can be prevented from being unnecessarily spaced from each other, thereby ensuring sufficient performance of detecting a foreign object.

In the present disclosure, the connecting lines are deemed to extend in substantially identical paths in principle if the connecting lines have any one or combination of the following three features:

1. the first connecting line 230 and the second connecting line 232 are adjacent to each other;
2. the first connecting line 230 and the second connecting line 232 have an overlap when viewed from the direction orthogonal to the main surface of the detection coil substrate 220; and
3. the first connecting line 230 and the second connecting line 232 are twisted around each other.

Figure 9:
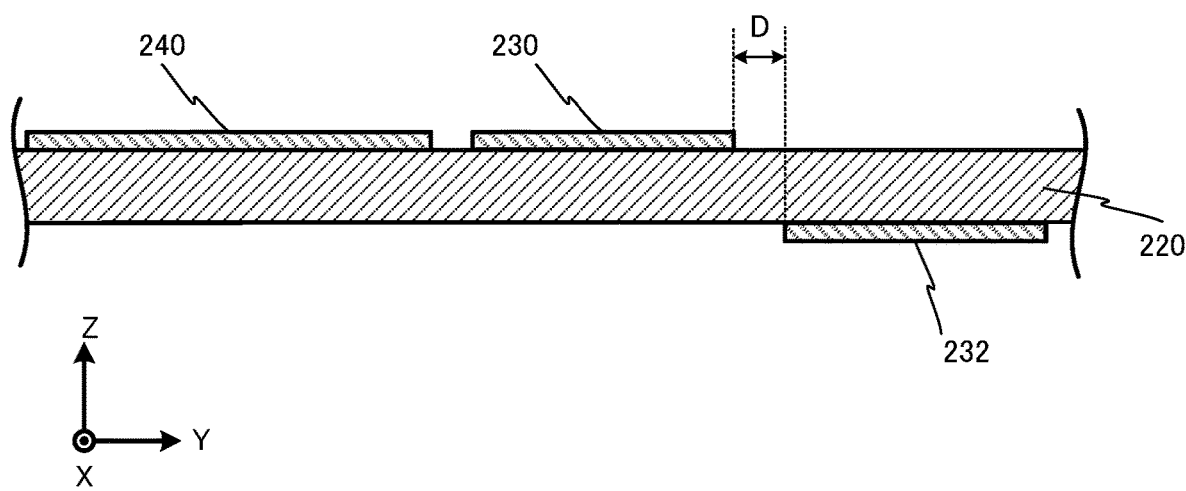
FIG. 9 is a sectional view taken along the line IX-IX of FIG. 4 for describing an arrangement structure of a first connecting line and a second connecting line.

FIG. 9 is a sectional view of the circuit pattern illustrated in FIG. 4 taken along the line IX-IX. In the exemplary structure illustrated in FIG. 9, the first connecting line 230 and the second connecting line 232 are adjacent to each other with a distance D therebetween when viewed from the direction orthogonal to the main surface of the detection coil substrate 220, and are mounted on one and the other surfaces of the detection coil substrate 220. The electric insulation between the first connecting line 230 and the second connecting line 232 is ensured by the detection coil substrate 220 and the distance D.

Figure 10A:
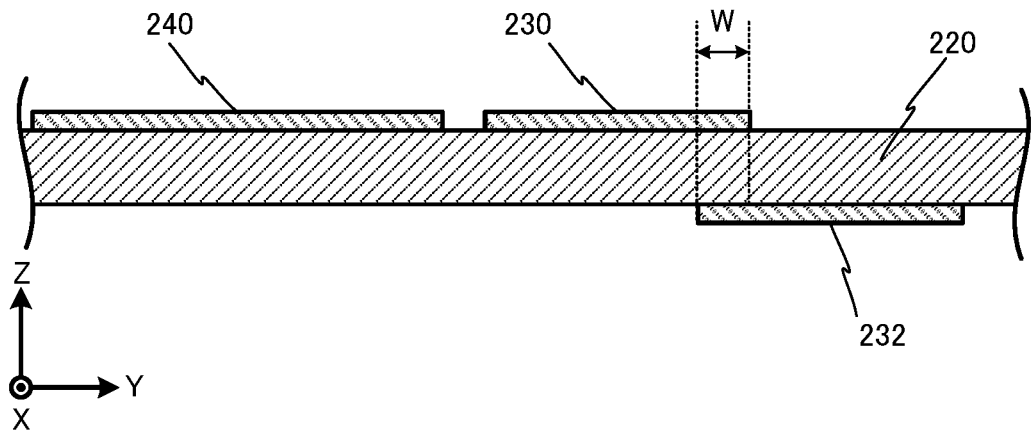
FIG. 10A is a sectional view illustrating a modification of the arrangement structure of the first connecting line and the second connecting line illustrated in FIG. 9.
Figure 10B:
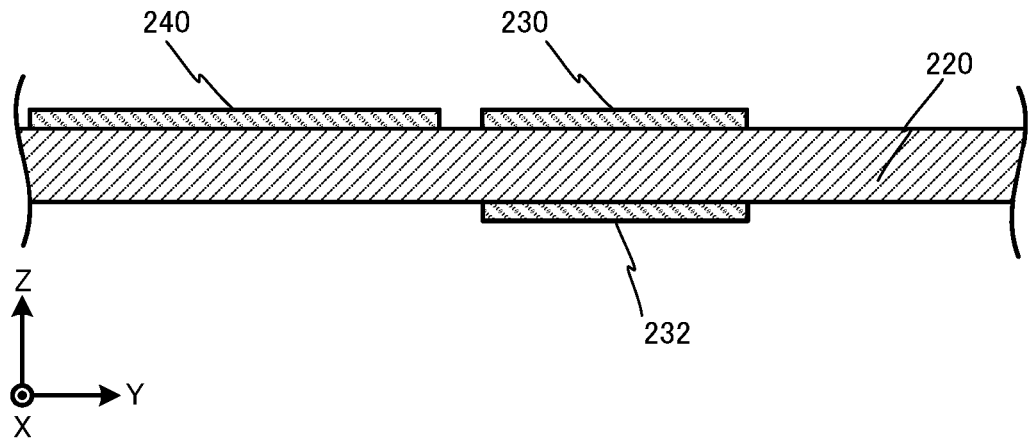
FIG. 10B is a sectional view illustrating a modification of the arrangement structure of the first connecting line and the second connecting line illustrated in FIG. 9.

FIGS. 10A and 10B illustrate modifications of the wiring structure illustrated in FIG. 9. In the structure illustrated in FIG. 10A, the first connecting line 230 and the second connecting line 232 are adjacent to each other when viewed from the direction orthogonal to the main surface of the detection coil substrate 220, mounted on one and the other surfaces of the detection coil substrate 220, and partially overlapped with each other with an overlap width W. The electric insulation between the first connecting line 230 and the second connecting line 232 is ensured by the detection coil substrate 220.

In the structure illustrated in FIG. 10B, the first connecting line 230 and the second connecting line 232 are adjacent to each other when viewed from the direction orthogonal to the main surface of the detection coil substrate 220, mounted on one and the other surfaces of the detection coil substrate 220, and substantially entirely overlapped with each other. The electric insulation between the first connecting line 230 and the second connecting line 232 is ensured by the detection coil substrate 220.

The distance D between the first connecting line 230 and the second connecting line 232 and the overlap width W of the first connecting line 230 and the second connecting line 232 are appropriately defined to ensure the insulation in view of safety factors in circuit design.

A decrease in the distance D or an increase in the overlap width W can achieve a reduction in the amount of the alternating magnetic flux 1 to interlink with the loop circuit configured by the first connecting line 230 and the second connecting line 232.

FIGS. 4, 9, and 10 illustrate examples in which the first connecting line 230 is mounted on the one main surface (upper surface) of the detection coil substrate 220 while the second connecting line 232 is mounted on the other main surface (lower surface) of the detection coil substrate 220. Alternatively, the first connecting line 230 may be mounted on the other main surface (lower surface) of the detection coil substrate 220 while the second connecting line 232 may be mounted on the one main surface (upper surface) of the detection coil substrate 220. In addition, the coils 240 may be arranged on any of the one and the other main surfaces.

Figure 11A:
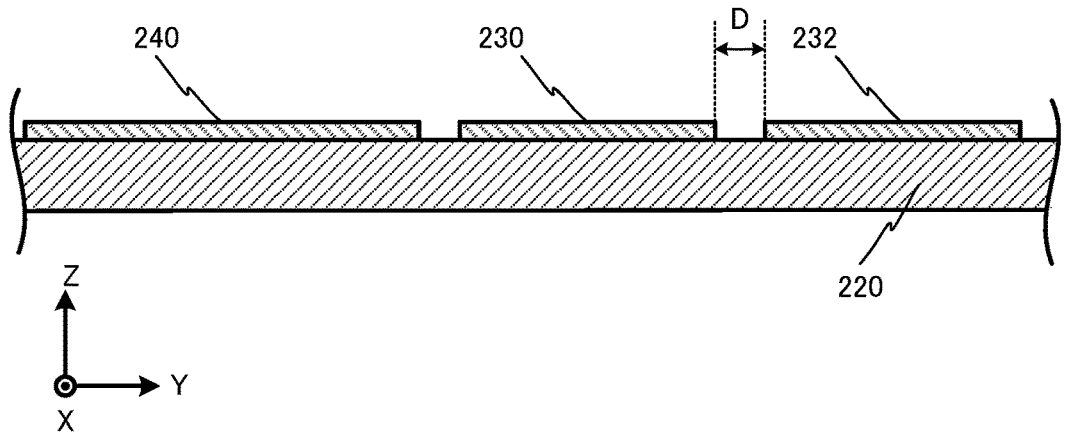
FIG. 11A is a sectional view illustrating a modification of the arrangement structure of the first connecting line and the second connecting line according to Embodiment 1.
Figure 11B:
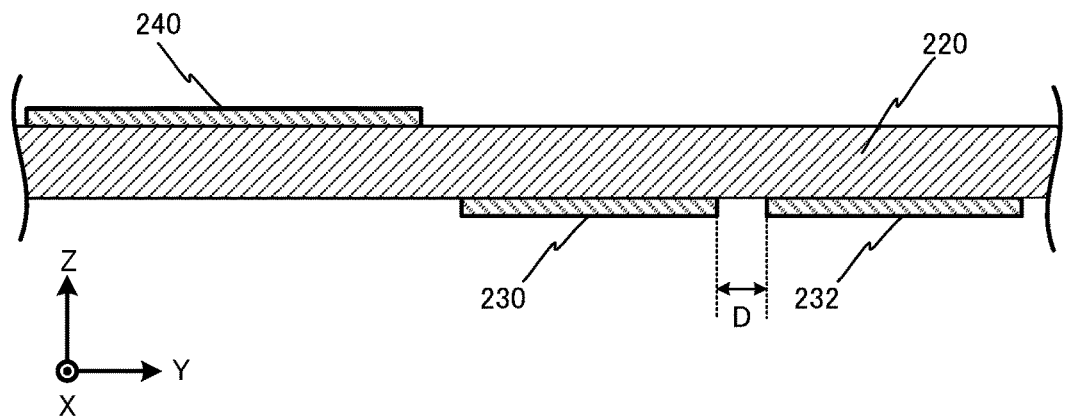
FIG. 11B is a sectional view illustrating a modification of the arrangement structure of the first connecting line and the second connecting line according to Embodiment 1.
Figure 11C:
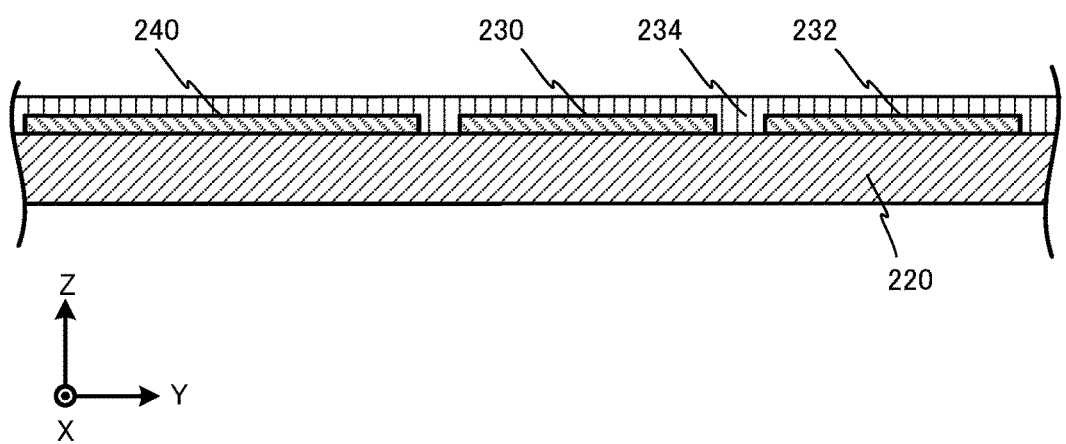
FIG. 11C is a sectional view illustrating a modification of the arrangement structure of the first connecting line and the second connecting line according to Embodiment 1.

FIGS. 4, 9, and 10 illustrate examples in which the first connecting line 230 and the second connecting line 232 are mounted on the respective opposite surfaces of the detection coil substrate 220. Alternatively, as illustrated in FIGS. 11A and 11B, the first connecting line 230 and the second connecting line 232 may be mounted on the same surface of the detection coil substrate 220 and adjacent to each other. In these exemplary structures, the electric insulation between the first connecting line 230 and the second connecting line 232 is ensured by the distance D. The detection coil substrate 220 is preferably provided with a magnetically permeable insulating layer 234 as illustrated in FIG. 11C, to improve the insulation properties of the first connecting line 230 and the second connecting line 232 and further decrease the distance D.

FIGS. 4 and 9 to 11 illustrate examples in which the first connecting line 230 and the second connecting line 232 extend approximately in parallel to each other. Alternatively, as illustrated in the plan view of FIG. 12A and the sectional view of FIG. 12B taken along the line B-B, for example, the first connecting line 230 and the second connecting line 232 may have a twisted-wire structure and thereby configure a loop circuit defining a small opening. In this structure, the first connecting line 230 and the second connecting line 232 have a plurality of intersections. Specifically, the first connecting line 230 represented by the solid line segments in FIGS. 12A and 12B repeats extending on the one main surface of the detection coil substrate 220, extending through a via hole to the other main surface of the detection coil substrate 220, extending on the other main surface, extending through a via hole to the one main surface of the detection coil substrate 220, and then extending on the one main surface. In contrast, the second connecting line 232 represented by the dashed line segments repeats extending on the other main surface of the detection coil substrate 220, extending through a via hole to the one main surface of the detection coil substrate 220, extending on the one main surface, extending through the via hole to the other main surface of the detection coil substrate 220, and then extending on the other main surface. When viewed from the direction orthogonal to the main surface of the detection coil substrate 220, the first connecting line 230 and the second connecting line 232 alternately cross each other a plurality of times at the boundary of the via holes and are adjacent to each other while being twisted around each other. This structure can further reduce the area of the opening of the loop circuit.

In the vicinity of an inner peripheral region 108 and the outer peripheral region 110 of the power transmission coil 106, the first connecting line 230 and the second connecting line 232 are preferably arranged in view of the directions of lines of magnetic force generated at the power transmission coil 106.

This respect is described in more detail below with reference to FIG. 13.

As illustrated in FIG. 13, due to the positional relationship between the power transmission coil 106 and the detection coil unit 22, the lines of magnetic force MF generated at the power transmission coil 106 are inclined from the detection coil substrate 220 in the regions facing the inner peripheral region 108 and the outer peripheral region 110 of the power transmission coil 106. In order to prevent such inclined lines of magnetic force MF from passing through the space between the first connecting line 230 and the second connecting line 232, the first connecting line 230 and the second connecting line 232 are preferably arranged as illustrated in FIG. 13.

That is, in the region facing the inner peripheral region 108 of the power transmission coil 106, the first connecting line 230 mounted on the surface (upper surface) further from a coil surface CS1 is located at a position further from a center CE1 of the coil surface CS1 of the power transmission coil 106, than the second connecting line 232 mounted on the surface (lower surface) closer to the coil surface CS1.

In contrast, in the region facing the outer peripheral region 110 of the power transmission coil 106, the first connecting line 230 mounted on the surface (upper surface) further from the coil surface CS1 is located at a position closer to the center CE1 of the coil surface CS1 of the power transmission coil 106, than the second connecting line 232 mounted on the surface (lower surface) closer to the coil surface CS1.

This arrangement can reduce the alternating magnetic flux Φ passing through the space between the first connecting line 230 and the second connecting line 232 in the vicinity of the inner peripheral region 108 and the outer peripheral region 110 of the power transmission coil 106, in comparison to other arrangements.

The above description is directed to the segments of the first connecting line 230 and the second connecting line 232 that connect the loop coils 222 to the external connector 224 on the detection coil substrate 220, among the entire segments that connect the loop coils 222 to the detector 26. Also, the segments of the first connecting line 230 and the second connecting line 232 that connect the external connector 224 to the detector 26 preferably define an opening as small as possible. The connecting lines therefore preferably have a structure similar to the wiring structure on the detection coil substrate 220 in the case where a printed circuit board is used for connection, and are preferably twisted pair lines in the case where a cable is used for connection, for example.

The external connector 224 is not necessarily a connector independent as a component. The external connector 224 is only required to have a function of establishing connection to external circuits, and may be a terminal or pad for connection to external circuits.

Embodiment 2

Figure 14:
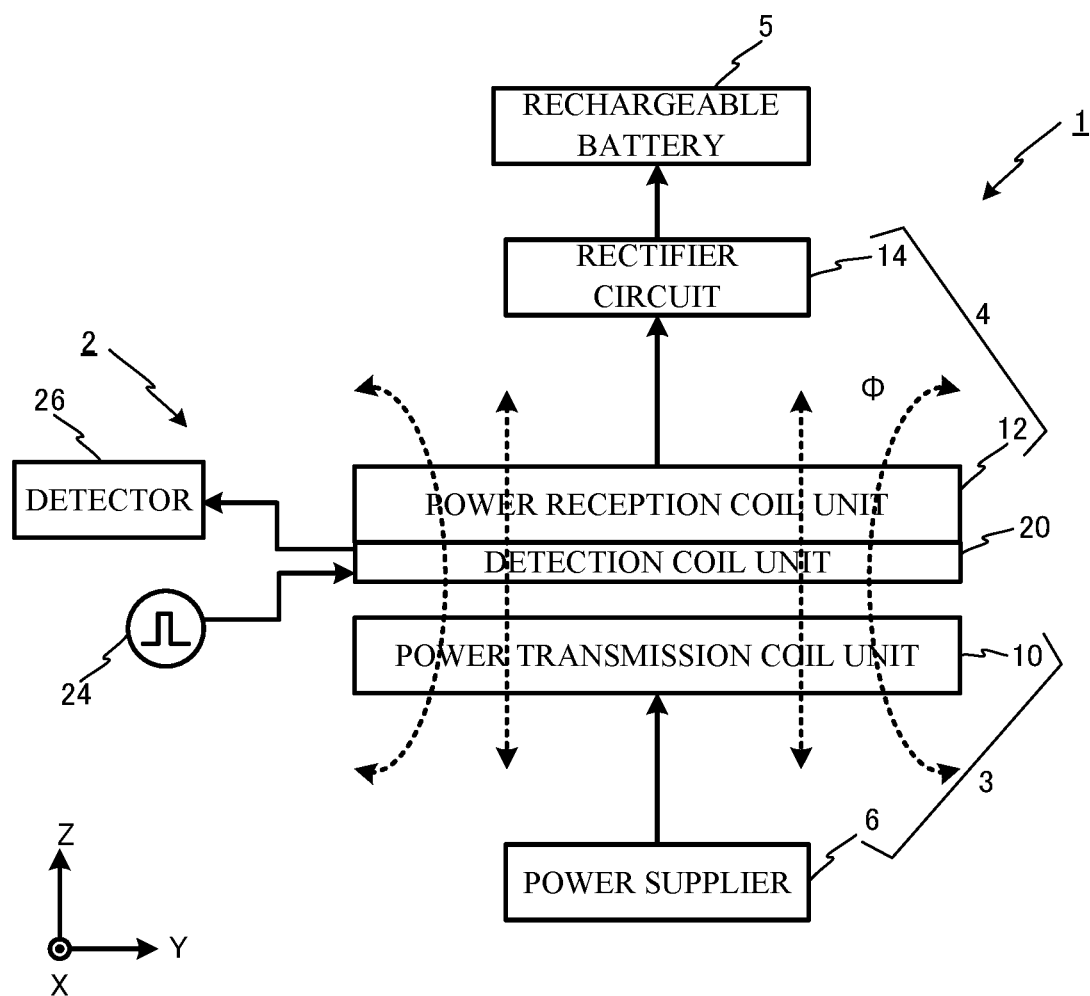
FIG. 14 illustrates a configuration of a power transfer system including a foreign object detection device according to Embodiment 2 of the present disclosure.

Although the detection coil unit 22 is disposed on the upper surface of the power transmission coil unit 10 in Embodiment 1, the detection coil unit 22 may be disposed on the lower surface of the power reception coil unit 12, as illustrated in FIG. 14.

Figure 15:
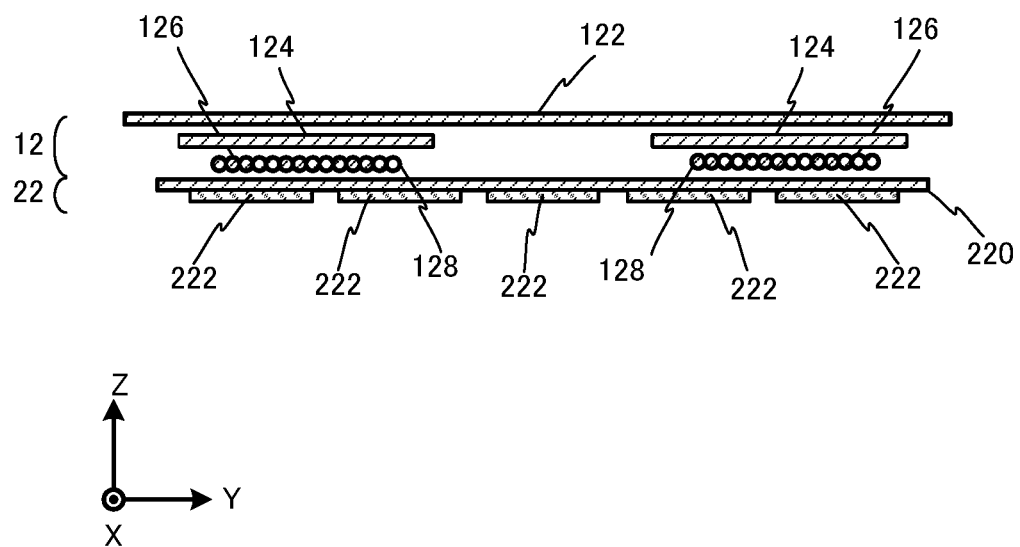
FIG. 15 is a sectional view of a power reception coil unit and a detection coil unit disposed on the lower surface of the power reception coil unit according to Embodiment 2.

In this case, as illustrated in FIG. 15, the power reception coil unit 12 includes components corresponding to the respective components of the power transmission coil unit 10. Specifically, the power reception coil unit 12 includes a substrate 122, a magnetic plate 124, and a power reception coil 126 mounted on the lower surface of the magnetic plate 124. The power reception coil 126 defines an opening and includes a conductive wire coiled in a flat spiral.

In contrast, the detection coil unit 22 is disposed on the lower surface of the power reception coil unit 12, and includes the loop coils 222, the first connecting line 230, and the second connecting line 232. The first connecting line 230 and the second connecting line 232 extend in substantially identical paths on the detection coil substrate 220.

Figure 16A:
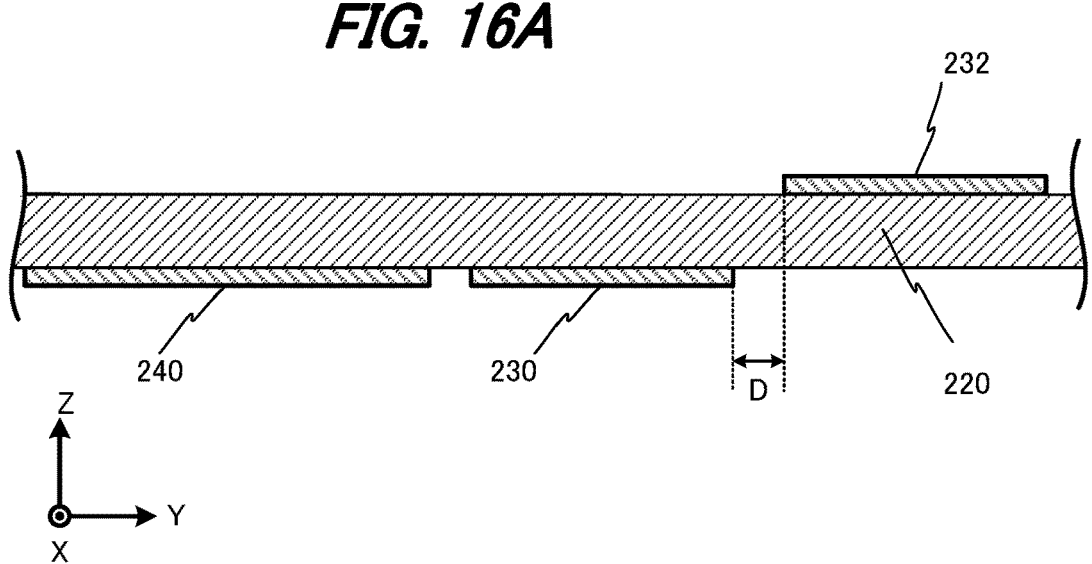
FIG. 16A is a sectional view illustrating an exemplary arrangement structure of a first connecting line and a second connecting line according to Embodiment 2.
Figure 16B:
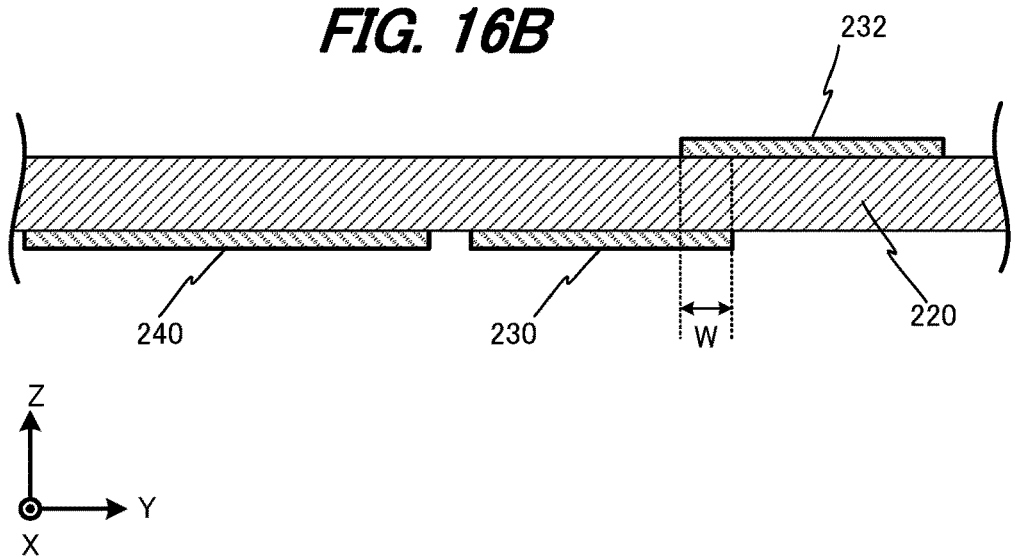
FIG. 16B is a sectional view illustrating an exemplary arrangement structure of the first connecting line and the second connecting line according to Embodiment 2.
Figure 16C:
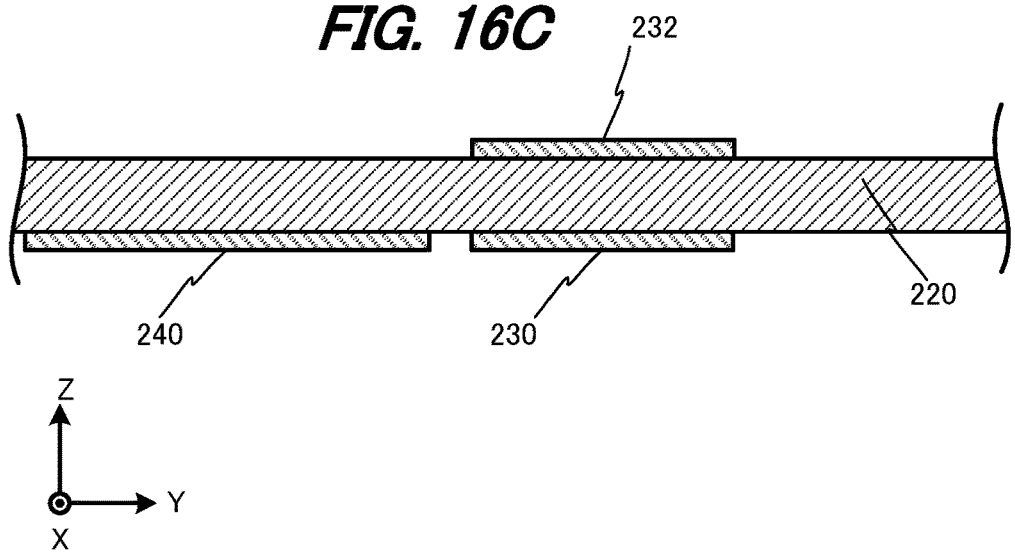
FIG. 16C is a sectional view illustrating an exemplary arrangement structure of the first connecting line and the second connecting line according to Embodiment 2.

For example, as illustrated in FIG. 16A, the first connecting line 230 and the second connecting line 232 are adjacent to each other with a distance D therebetween, mounted on one and the other surfaces of the detection coil substrate 220, and extend in substantially identical paths. Alternatively, the connecting lines may be partially overlapped with each other with an overlap width W, as illustrated in FIG. 16B, or entirely overlapped with each other, as illustrated in FIG. 16C.

Figure 17A:
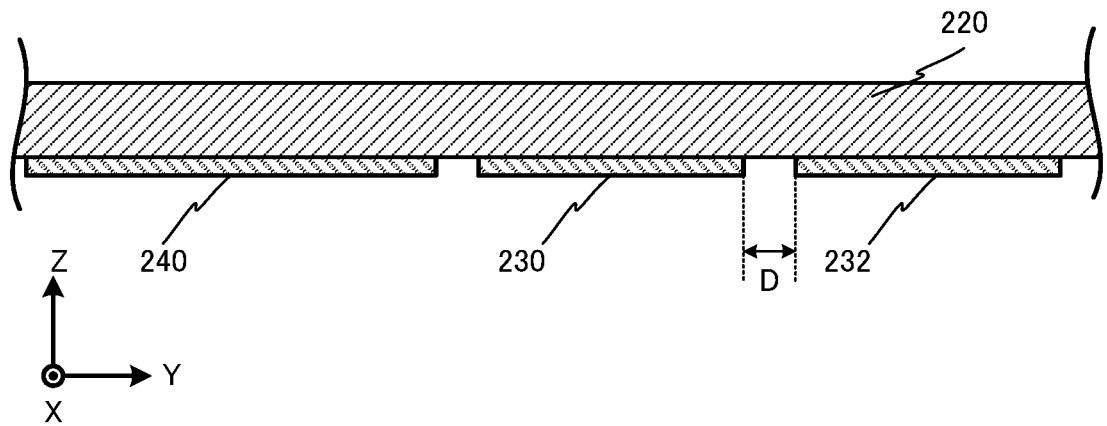
FIG. 17A is a sectional view illustrating an exemplary arrangement structure of the first connecting line and the second connecting line according to Embodiment 2.
Figure 17B:
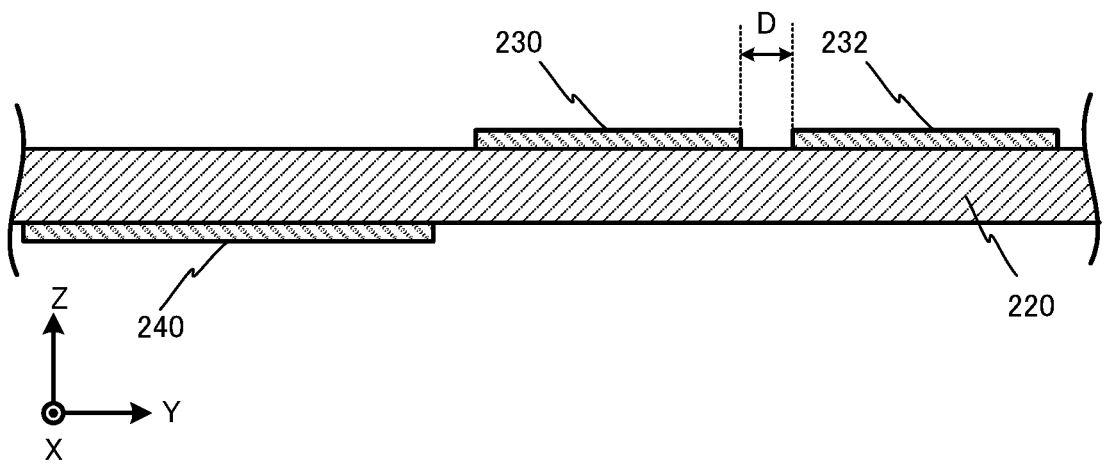
FIG. 17B is a sectional view illustrating an exemplary arrangement structure of the first connecting line and the second connecting line according to Embodiment 2.
Figure 17C:
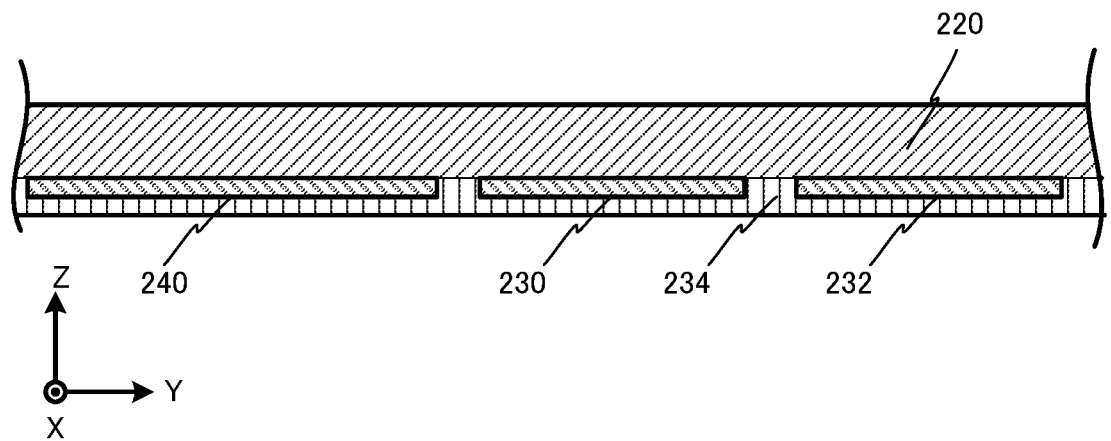
FIG. 17C is a sectional view illustrating an exemplary arrangement structure of the first connecting line and the second connecting line according to Embodiment 2.

Alternatively, as illustrated in FIGS. 17A and 17B, the first connecting line 230 and the second connecting line 232 may be adjacent to each other with the distance D therebetween on the same main surface of the detection coil substrate 220 and extend in substantially identical paths, for example. Alternatively, as illustrated in FIG. 17C, the insulating layer 234 may be disposed between the first connecting line 230 and the second connecting line 232.

Figure 12A:
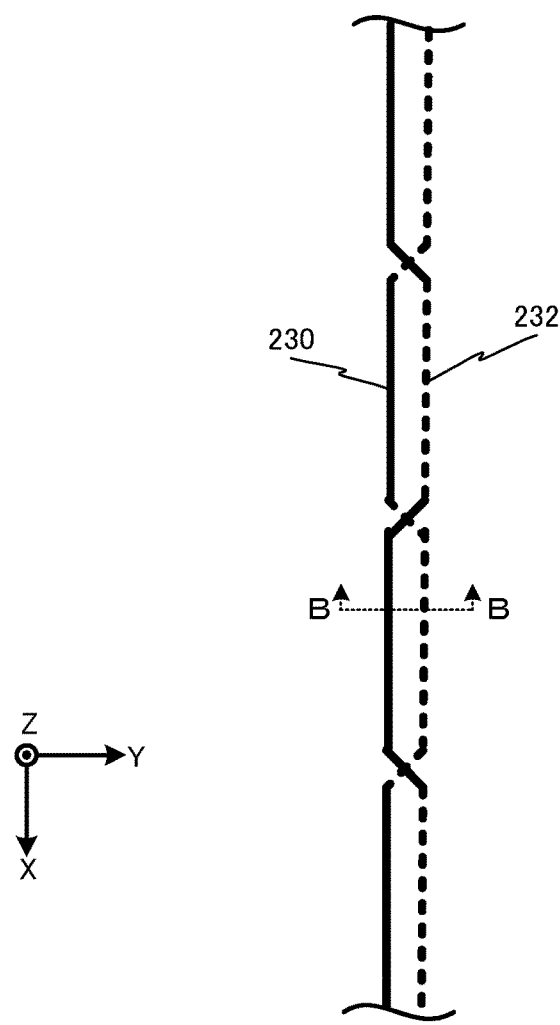
FIG. 12A is a plan view illustrating another modification of the arrangement structure of the first connecting line and the second connecting line according to Embodiment 1, in which the first connecting line and the second connecting line extend while being twisted around each other.
Figure 12B:
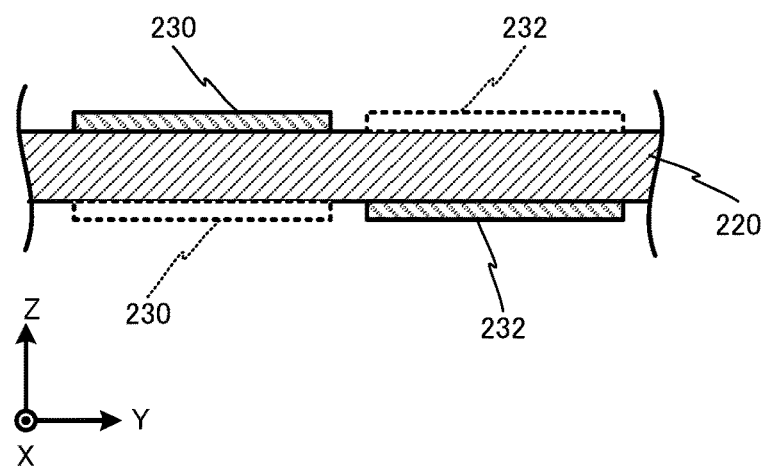
FIG. 12B is a sectional view taken along the line B-B of FIG. 12A.

Alternatively, the first connecting line 230 and the second connecting line 232 may extend while being twisted around each other, as in the structure illustrated in FIGS. 12A and 12B.

In the vicinity of an inner peripheral region 128 and an outer peripheral region 130 of the power reception coil 126, the first connecting line 230 and the second connecting line 232 are preferably arranged in view of the directions of lines of magnetic force generated at the power reception coil 126.

This respect is described below with reference to FIG. 18. As illustrated in FIG. 18, the lines of magnetic force MF generated at the power reception coil 126 are inclined from the detection coil substrate 220 in the vicinity of the inner peripheral region 128 and the outer peripheral region 130 of the power reception coil 126. The first connecting line 230 and the second connecting line 232 are preferably arranged in order to prevent such inclined lines of magnetic force MF from passing through the space between the first connecting line 230 and the second connecting line 232. That is, in the region facing the inner peripheral region 128 of the power reception coil 126, the first connecting line 230 mounted on the surface (lower surface) further from a coil surface CS2 is located at a position further from a center CE2 of the coil surface CS2 of the power reception coil 126, than the second connecting line 232 mounted on the surface (upper surface) closer to the coil surface CS2. In contrast, in the region facing the outer peripheral region 130 of the power reception coil 126, the first connecting line 230 mounted on the surface (lower surface) further from the coil surface CS2 is located at a position closer to the center CE2 of the coil surface CS2, than the second connecting line 232 mounted on the surface (upper surface) closer to the coil surface CS2. This arrangement can reduce the alternating magnetic flux 1 passing through the space between the first connecting line 230 and the second connecting line 232 in the vicinity of the inner peripheral region 128 and the outer peripheral region 130 of the power reception coil 126, in comparison to other arrangements.

Figure 19:
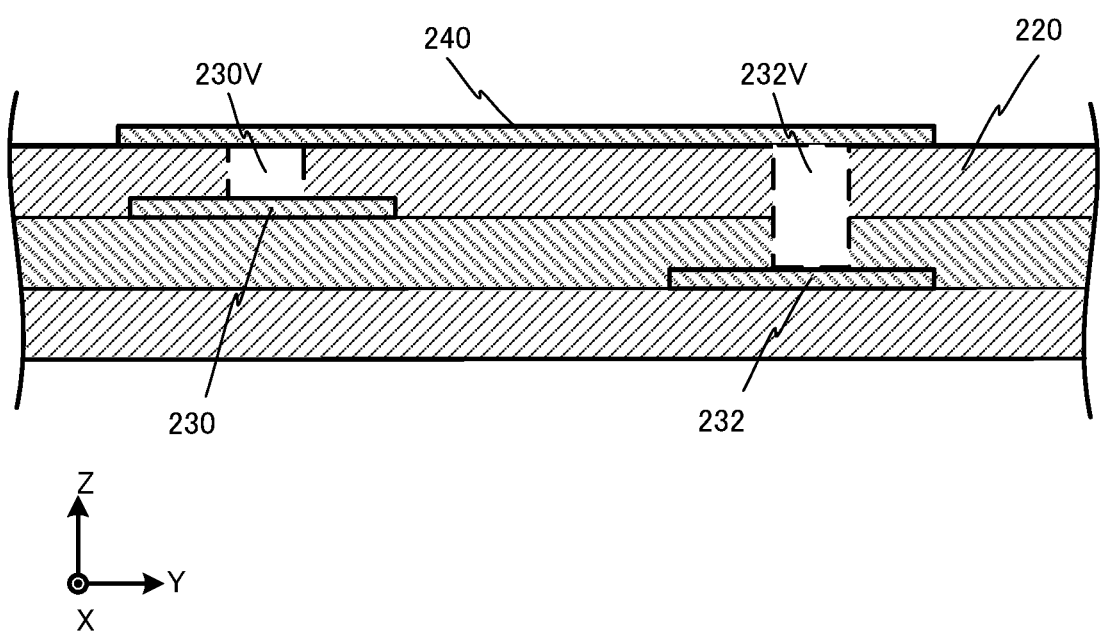
FIG. 19 is a sectional view illustrating a modification of the arrangement structure of the first connecting line and the second connecting line according to the embodiments.

In the above-described embodiments, the first connecting line 230 and the second connecting line 232 are disposed on the same surface as the other conductive patterns of the detection coil substrate 220. This configuration is not intended to limit the scope of the present disclosure. For example, as illustrated in FIG. 19, the detection coil substrate 220 may have a multilayer structure, and the first connecting line 230 and the second connecting line 232 may be mounted on surfaces different from the upper or lower surface on which the conductive patterns of the coils 240 are mounted. In this case, the coils 240 are connected to the first connecting line 230 and the second connecting line 232 through via holes 230V and 232V, for example.

Although the existence of a foreign object is detected by applying a single pulsed voltage to the loop coil 222 and observing a vibration of the voltage V between both terminals of the resonant circuit in the above-described embodiments, the vibration of the voltage between both terminals of the resonant circuit may be generated by another procedure. For example, a vibration of the voltage between both terminals of the resonant circuit may be generated by applying a pulsed voltage from the pulse generator 24 to the power transmission coil 106 and inducing a pulsed magnetic flux in the power transmission coil 106 to cause a vibration. The loop coil 222 may also receive a sinusoidal voltage instead of the pulsed voltage. Alternatively, the existence of a foreign object may be detected by generating a vibration of the voltage between both terminals of the resonant circuit due to the alternating magnetic flux 1 generated at the power transmission coil 106, and observing the generated vibration.

The above-described embodiments are directed to the power transmission coil unit 10, the power reception coil unit 12, and the power transfer system 1 for charging the rechargeable battery 5, and the foreign object detection device 2 applied thereto. The power transmission, power reception, and power transfer may also be intended for any purpose, other than charging of a rechargeable battery.

As described above, a foreign object detection device according to an aspect of the present disclosure includes: a plurality of coils mounted on a substrate to be excited and thus generate a vibration signal; a detector to detect the existence of a foreign object on the basis of the vibration signal; a first connecting line to connect one terminals of the individual coils to the detector; and a second connecting line to connect the other terminals of the individual coils to the detector. The first connecting line and the second connecting line extend in substantially identical paths in at least segments mounted on the substrate among paths from the individual coils to the detector.

In the foreign object detection device according to this aspect of the present disclosure, the first connecting line and the second connecting line extend in substantially identical paths in at least the segments mounted on the substrate among the paths from the individual coils to the detector. The connecting lines therefore do not configure a loop circuit defining a large opening, and can decrease the induced voltage. This configuration can avoid a damage in circuits.

For example, the first connecting line and the second connecting line may have a plurality of intersections in at least the segments mounted on the substrate among the paths from the individual coils to the detector when viewed from the direction orthogonal to a surface of the substrate provided with the coils.

For example, each of the coils may include a first conductive pattern mounted on a first surface of the substrate and a second conductive pattern mounted on a second surface of the substrate different from the first surface, one end of the first conductive pattern may be connected to one end of the second conductive pattern, the first connecting line and the second connecting line may be mounted on mutually different surfaces of the substrate, the first connecting line may be connected to the other end of the first conductive pattern, the second connecting line may be connected to the other end of the second conductive pattern, and the first connecting line and the second connecting line may have an overlap in at least the segments mounted on the substrate among the paths from the individual coils to the detector when viewed from the direction orthogonal to the first surface.

For example, the first connecting line may be mounted on the first surface, and the second connecting line may be mounted on the second surface.

For example, the first connecting line and the second connecting line may be mounted on surfaces of the substrate different from the first surface and the second surface.

A power transmission device according to another aspect of the present disclosure includes any one of the above-described foreign object detection devices.

A power transmission device according to another aspect of the present disclosure includes: a power transmission coil including a coiled conductive wire and defining an opening; and any one of the above-described foreign object detection devices, for example. The coils may be disposed to cover a coil surface of the power transmission coil, the distance between the surface of the substrate provided with the first connecting line and the coil surface of the power transmission coil may be larger than the distance between the surface of the substrate provided with the second connecting line and the coil surface of the power transmission coil, and the first connecting line and the second connecting line may be arranged such that the first connecting line is located at a position further from the center of the coil surface of the power transmission coil than the second connecting line, in a region facing an inner peripheral region of the power transmission coil as viewed from the direction orthogonal to the coil surface of the power transmission coil.

A power transmission device according to another aspect of the present disclosure includes: a power transmission coil including a coiled conductive wire and defining an opening; and any one of the above-described foreign object detection devices, for example. The coils may be disposed to cover a coil surface of the power transmission coil, the distance between the surface of the substrate provided with the first connecting line and the coil surface of the power transmission coil may be larger than the distance between the surface of the substrate provided with the second connecting line and the coil surface of the power transmission coil, and the first connecting line and the second connecting line may be arranged such that the first connecting line is located at a position closer to the center of the coil surface of the power transmission coil than the second connecting line, in a region facing an outer peripheral region of the power transmission coil as viewed from the direction orthogonal to the coil surface of the power transmission coil.

A power reception device according to another aspect of the present disclosure includes any one of the above-described foreign object detection devices.

A power reception device according to another aspect of the present disclosure includes: a power reception coil including a coiled conductive wire and defining an opening; and any one of the above-described foreign object detection devices, for example. The coils may be disposed to cover a coil surface of the power reception coil, the distance between the surface of the substrate provided with the first connecting line and the coil surface of the power reception coil may be larger than the distance between the surface of the substrate provided with the second connecting line and the coil surface of the power reception coil, and the first connecting line and the second connecting line may be arranged such that the first connecting line is located at a position further from the center of the coil surface of the power reception coil than the second connecting line, in a region facing an inner peripheral region of the power reception coil as viewed from the direction orthogonal to the coil surface of the power reception coil.

A power reception device according to another aspect of the present disclosure includes: a power reception coil including a coiled conductive wire; and any one of the above-described foreign object detection devices, for example. The coils may be disposed to cover a coil surface of the power reception coil, the distance between the surface of the substrate provided with the first connecting line and the coil surface of the power reception coil may be larger than the distance between the surface of the substrate provided with the second connecting line and the coil surface of the power reception coil, and the first connecting line and the second connecting line may be arranged such that the first connecting line is located at a position closer to the center of the coil surface of the power reception coil than the second connecting line, in a region facing an outer peripheral region of the power reception coil as viewed from the direction orthogonal to the coil surface of the power reception coil.

A power transfer system according to another aspect of the present disclosure includes: a power transmission device; and a power reception device. At least one of the power transmission device or the power reception device includes any one of the above-described foreign object detection devices.

A power transfer system according to another aspect of the present disclosure includes: a power transmission device; and a power reception device. The power transmission device includes any one of the above-described power transmission devices.

A power transfer system according to another aspect of the present disclosure includes: a power transmission device; and a power reception device. The power reception device includes any one of the above-described power reception devices.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is widely applicable to a foreign object detection device to detect a foreign object existing in the vicinity of a power transmission coil and a power reception coil, and to a power transmission device, a power reception device, and a power transfer system.

REFERENCE SIGNS LIST

1 Power transfer system
2 Foreign object detection device
3 Power transmission device
4 Power reception device
5 Rechargeable battery
6 Power supplier
10 Power transmission coil unit
12 Power reception coil unit
22 Detection coil unit
24 Pulse generator
26 Detector
102, 122 Substrate
104, 124 Magnetic plate
106 Power transmission coil
108, 128 Inner peripheral region
110, 130 Outer peripheral region
126 Power reception coil
220 Detection coil substrate
222 Loop coil
224 External connector
230 First connecting line
232 Second connecting line
240 Coil
242 Capacitor
244, 246 Switch

The invention claimed is:

1. A foreign object detection device, comprising
a plurality of coils mounted on a substrate to be excited and thus generate a vibration signal;
a detector to detect existence of a foreign object on basis of the vibration signal;
a first connecting line to connect one terminals of the individual coils to the detector; and
a second connecting line to connect other terminals of the individual coils to the detector, wherein
the first connecting line and the second connecting line extend in substantially identical paths in at least segments mounted on the substrate among paths from the individual coils to the detector.

2. The foreign object detection device according to claim 1, wherein the first connecting line and the second connecting line have a plurality of intersections in at least the segments mounted on the substrate among the paths from the individual coils to the detector when viewed from a direction orthogonal to a surface of the substrate provided with the coils.

3. The foreign object detection device according to claim 1, wherein
each of the coils has a first conductive pattern mounted on a first surface of the substrate and a second conductive pattern mounted on a second surface of the substrate, the second surface being different from the first surface,
one end of the first conductive pattern is connected to one end of the second conductive pattern,
the first connecting line and the second connecting line are mounted on mutually different surfaces of the substrate,
the first connecting line is connected to another end of the first conductive pattern,
the second connecting line is connected to another end of the second conductive pattern, and
the first connecting line and the second connecting line have an overlap in at least the segments mounted on the substrate among the paths from the individual coils to the detector when viewed from a direction orthogonal to the first surface.

4. The foreign object detection device according to claim 3, wherein
the first connecting line is mounted on the first surface, and
the second connecting line is mounted on the second surface.

5. The foreign object detection device according to claim 3, wherein the first connecting line and the second connecting line are mounted on surfaces of the substrate different from the first surface and the second surface.

6. A power transmission device, comprising:
the foreign object detection device according to claim 1.

7. A power transmission device, comprising:
a power transmission coil including a coiled conductive wire and defining an opening; and the foreign object detection device according to claim 3, wherein the coils are disposed to cover a coil surface of the power transmission coil, a distance between the surface of the substrate provided with the first connecting line and the coil surface of the power transmission coil is larger than a distance between the surface of the substrate provided with the second connecting line and the coil surface of the power transmission coil, and the first connecting line and the second connecting line are arranged such that the first connecting line is located at a position further from a center of the coil surface of the power transmission coil than the second connecting line, in a region facing an inner peripheral region of the power transmission coil as viewed from a direction orthogonal to the coil surface of the power transmission coil.

8. A power transmission device, comprising:

a power transmission coil including a coiled conductive wire and defining an opening; and the foreign object detection device according to claim 3, wherein the coils are disposed to cover a coil surface of the power transmission coil, a distance between the surface of the substrate provided with the first connecting line and the coil surface of the power transmission coil is larger than a distance between the surface of the substrate provided with the second connecting line and the coil surface of the power transmission coil, and the first connecting line and the second connecting line are arranged such that the first connecting line is located at a position closer a center of the coil surface of the power transmission coil than the second connecting line, in a region facing an outer peripheral region of the power transmission coil as viewed from a direction orthogonal to the coil surface of the power transmission coil.

9. A power reception device, comprising:

the foreign object detection device according to claim 1.

10. A power reception device, comprising:

a power reception coil including a coiled conductive wire and defining an opening; and the foreign object detection device according to claim 3, wherein the coils are disposed to cover a coil surface of the power reception coil, a distance between the surface of the substrate provided with the first connecting line and the coil surface of the power reception coil is larger than a distance between the surface of the substrate provided with the second connecting line and the coil surface of the power reception coil, and the first connecting line and the second connecting line are arranged such that the first connecting line is located at a position further from a center of the coil surface of the power reception coil than the second connecting line, in a region facing an inner peripheral region of the power reception coil as viewed from a direction orthogonal to the coil surface of the power reception coil.

11. A power reception device, comprising:

a power reception coil including a coiled conductive wire; and the foreign object detection device according to claim 3, wherein the coils are disposed to cover a coil surface of the power reception coil, a distance between the surface of the substrate provided with the first connecting line and the coil surface of the power reception coil is larger than a distance between the surface of the substrate provided with the second connecting line and the coil surface of the power reception coil, and the first connecting line and the second connecting line are arranged such that the first connecting line is located at a position closer to a center of the coil surface of the power reception coil than the second connecting line, in a region facing an outer peripheral region of the power reception coil as viewed from a direction orthogonal to the coil surface of the power reception coil.

12. A power transfer system, comprising:

a power transmission device; and a power reception device, wherein at least one of the power transmission device or the power reception device comprises the foreign object detection device according to claim 1.

13. A power transfer system, comprising:

a power transmission device; and a power reception device, wherein the power transmission device comprises the power transmission device according to claim 7.

14. A power transfer system, comprising:

a power transmission device; and a power reception device, wherein the power reception device comprises the power reception device according to claim 10.

15. A power transfer system, comprising:

a power transmission device; and a power reception device, wherein the power transmission device comprises the power transmission device according to claim 8.

16. A power transfer system, comprising:

a power transmission device; and a power reception device, wherein the power reception device comprises the power reception device according to claim 11.

* * * * *